(12) United States Patent
Cai et al.

(10) Patent No.: US 12,321,361 B2
(45) Date of Patent: Jun. 3, 2025

(54) UNIFIED STRUCTURED AND SEMI-STRUCTURED DATA TYPES IN DATABASE SYSTEMS

(71) Applicant: Snowflake Inc., Bozeman, MT (US)

(72) Inventors: Xinzhu Cai, San Mateo, CA (US); Bowei Chen, San Bruno, CA (US); Prateek Gaur, San Jose, CA (US); Dmitry A. Lychagin, San Jose, CA (US); Muthunagappan Muthuraman, Sunnyvale, CA (US); Zhuo Peng, San Jose, CA (US); Mengran Wang, San Jose, CA (US); Jiaqi Yan, Menlo Park, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/497,746

(22) Filed: Oct. 30, 2023

(65) Prior Publication Data

US 2024/0427790 A1    Dec. 26, 2024

Related U.S. Application Data

(60) Provisional application No. 63/522,647, filed on Jun. 22, 2023.

(51) Int. Cl.
*G06F 16/20* (2019.01)
*G06F 16/25* (2019.01)
*G06F 16/835* (2019.01)

(52) U.S. Cl.
CPC .......... *G06F 16/254* (2019.01); *G06F 16/835* (2019.01)

(58) Field of Classification Search
None
See application file for complete search history.

(56) References Cited

U.S. PATENT DOCUMENTS

| | | | |
|---|---|---|---|
| 11,138,192 B1 * | 10/2021 | Chintala | G06F 16/986 |
| 11,461,351 B1 * | 10/2022 | Field | G06F 16/25 |
| 12,038,926 B1 * | 7/2024 | Pathak | G06F 16/2228 |
| 2012/0317078 A1 * | 12/2012 | Zhou | G06F 16/27 |
| | | | 707/610 |
| 2015/0039587 A1 * | 2/2015 | Liu | G06F 16/8365 |
| | | | 707/718 |

(Continued)

*Primary Examiner* — Jau Shya Meng
(74) *Attorney, Agent, or Firm* — Schwegman Lundberg & Woessner, P.A.

(57) ABSTRACT

The subject technology receives a query, the query referencing a unified representation for structured type data and semi-structured type data, the unified representation being provided in storage and in memory during query processing, the unified representation comprising a set of structured type fields that include a set of semi-structured typed fields that enables type safety and enforcement for the set of structured type fields, and flexibility for the set of semi-structured typed fields in a same column, the unified representation in storage including type information for the semi-structured type data as part of the semi-structured type data, the unified representation being utilized for structured type data and semi-structured type data. The subject technology processes the query using the unified representation stored in the memory, the unified representation providing performance parity between structured type data and semi-structured type data.

27 Claims, 10 Drawing Sheets

(56) References Cited

U.S. PATENT DOCUMENTS

2017/0116273 A1* 4/2017 Liu .................. G06F 16/24544
2017/0185593 A1* 6/2017 Kumar ................ G06F 16/2228
2024/0330340 A1* 10/2024 Guo ..................... G06F 16/334

* cited by examiner

900

RECEIVE A SET OF CODE STATEMENTS, THE SET OF CODE STATEMENTS INCLUDING FIRST CODE INDICATING A STRUCTURED DATA TYPE
902

DETERMINE THAT THE SET OF CODE STATEMENTS INCLUDES A DEFINITION OF CONTENT TYPE FOR AN ARRAY, AN OBJECT, OR A MAP
904

DETERMINE THAT THE SET OF CODE STATEMENTS INCLUDES SECOND CODE TO PERFORM A TYPE CONVERSION FROM THE STRUCTURED DATA TYPE TO A SEMI-STRUCTURED DATA TYPE
906

PERFORM, USING THE SECOND CODE, THE TYPE CONVERSION FROM THE STRUCTURED DATA TYPE TO THE SEMI-STRUCTURED DATA TYPE BASED AT LEAST IN PART ON THE DEFINITION OF CONTENT TYPE
908

*FIG. 9*

UNIFIED STRUCTURED AND SEMI-STRUCTURED DATA TYPES IN DATABASE SYSTEMS

CROSS-REFERENCE TO RELATED APPLICATIONS

This application claims priority to U.S. Provisional Patent Application Ser. No. 63/522,647, filed Jun. 22, 2023, entitled "UNIFIED STRUCTURED AND SEMI-STRUCTURED DATA TYPES IN DATABASE SYSTEMS," and the contents of which is incorporated herein by reference in its entirety for all purposes.

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

FIG. 9 is a flow diagram illustrating operations of a database system in performing a method, in accordance with some embodiments of the present disclosure.

DETAILED DESCRIPTION

Figure 1:
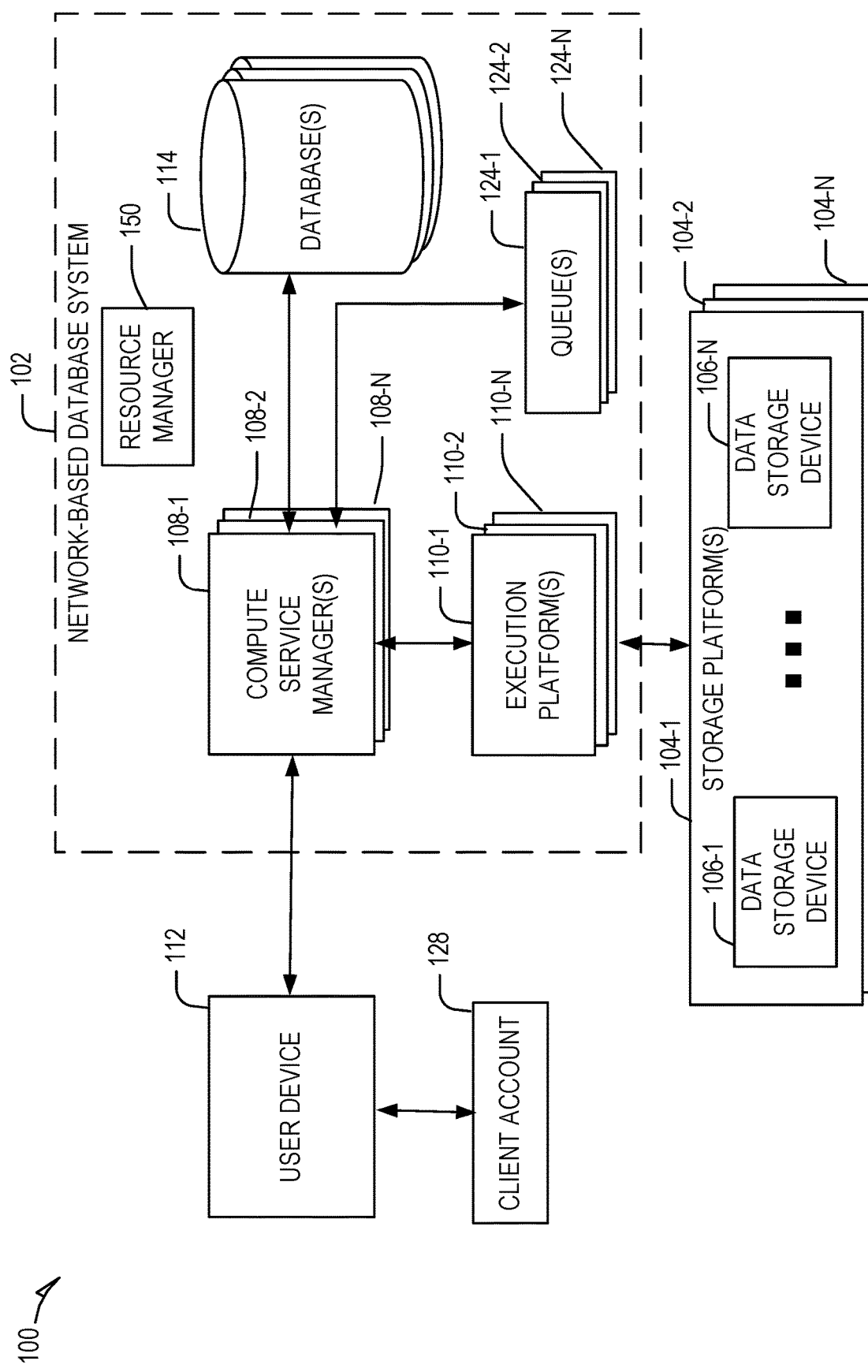
FIG. 1 illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored in the computing environment 100.

The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, AMAZON S3 storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

Figure 2:
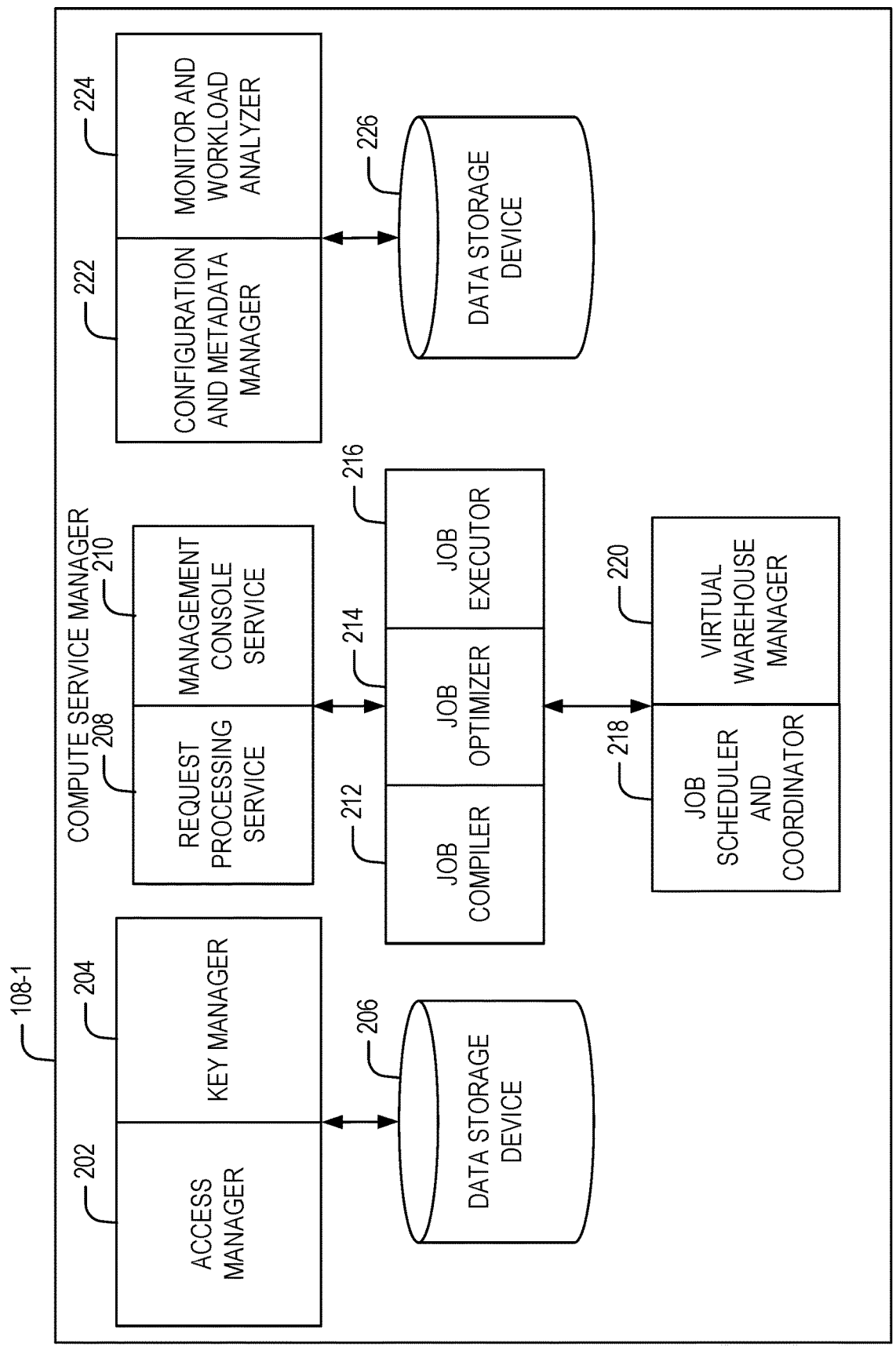
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s).

Although the above discussion and examples are related to compute service manager 108-1, in some embodiments, similar or the same components are included in each of the compute service managers shown in FIG. 1.

Figure 3:
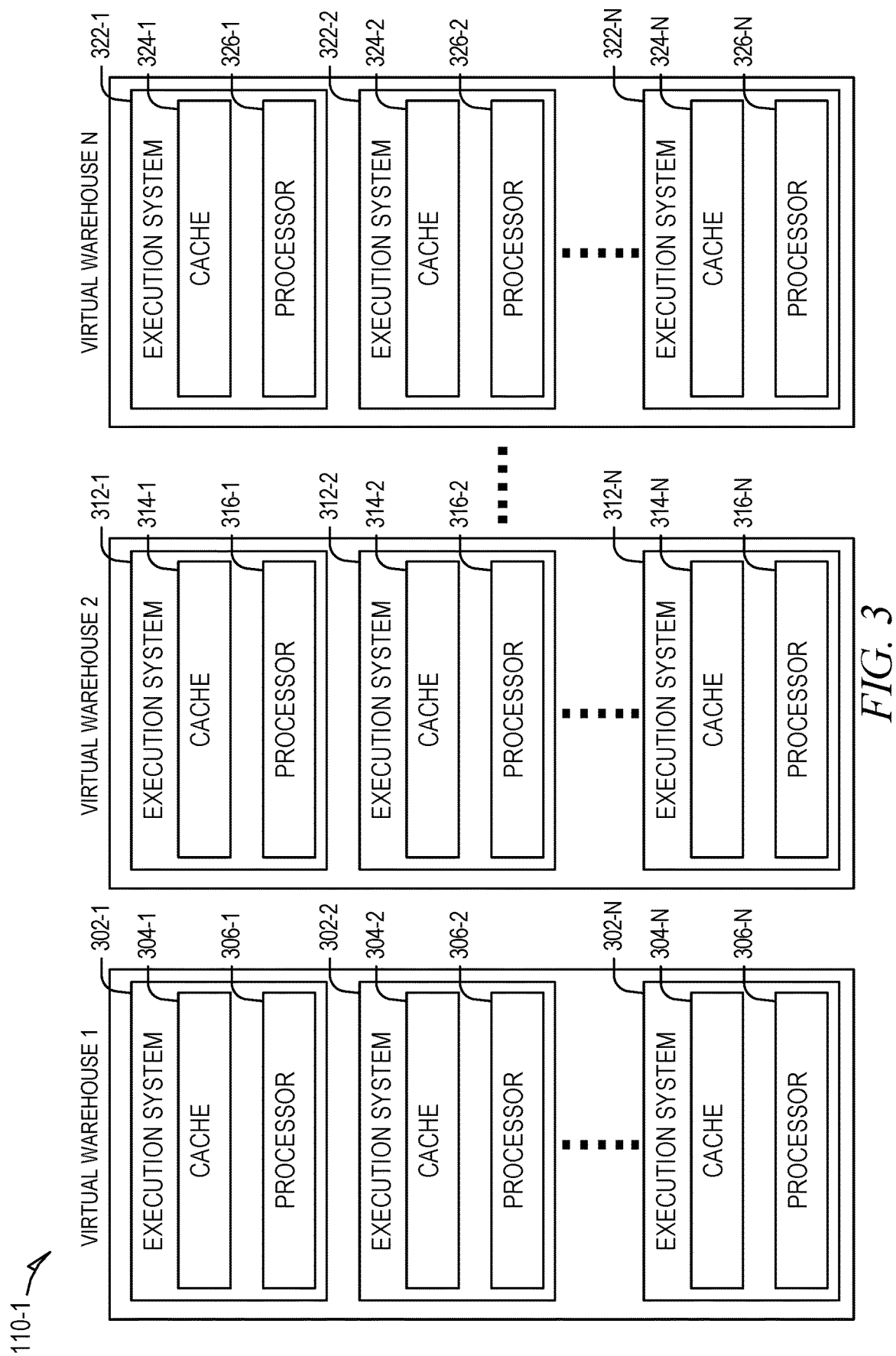
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

Embodiments of the subject technology provide at least the following:
  Introduce new data types in a query engine with user defined schema
  Seamless integration of structured data type stored in partitions or micro-partitions and Iceberg table format (e.g., an open metadata format (Apache Iceberg) that stores data in an open file format (Apache Parquet))
  Seamless integration of structured data type and semi-structured data type
  Comprehensive SQL functionalities of structured types as a superset of semi-structured data types
  Efficient metadata collection and data storage encoding leveraging data type schema and dynamically gathered statistic
  Efficient query execution leveraging data type schema In existing solutions, the following could be applicable or have been provided:
  Semi-structured data type, which allows flexible schema that associates with data. Since there's not enforced schema for semi-structured types, some optimizations in query compilation, query execution and data storage cannot be easily applied to them compared to the new structured data types.
  Prior solutions in other systems implement nested data types as standalone types whose schema will be entirely rigid and therefore lacks the flexibilities in certain use cases. Some key performance optimizations are also missing for these data types.

Some advantages of implementations of the subject technology include at least the following:
  Structured data types have native semi-structured data type integration that allows seamless transformation between these types and allow users with experience on the semi-structured data types to easily utilize the functionalities of structured types and vice versa.
  Native semi-structured data type integration with structured types enables flexible composition and type system and schema enforcement within the same data type.
  Unified SQL interface (Object, Map) enables easy transition and simpler user experience.
  Comprehensive metadata-based data-dependent optimization and efficient encoding data storage leveraging the data type schema and dynamically gathered statistics automatically.

In an example, some characteristics of the subject system include the following:
  Semantic enforcement (type system, schema enforcements)
  Performance optimizations
    Unified and continuous performance behaviors
    No performance cliffs when moving between structured and semi-structured type
    Smart optimizations applicable to both structured and semi-structured types
  Unified experience from both language interface and performance perspectives.

As mentioned herein, a structured type is an array, an object, or a map type whose definition is known and enforced by the subject system. An array of integers is an example of a structured type. An object with known fields and their respective types is a structured object type.

In comparison, as used herein, semi-structured data is meant to convey a form of structured data that does not conform with the typical formal structure of data models associated with relational, but nonetheless contains tags or other markers to separate semantic elements and enforce hierarchies of records and fields within the data.

Two of the key attributes that distinguish semi-structured data from structured data are nested data structures and the lack of a fixed schema:
  Structured data requires a fixed schema that is defined before the data can be loaded and queried in a relational database system. Semi-structured data does not require a prior definition of a schema and can constantly evolve (e.g., new attributes can be added at any time). In addition, entities within the same class may have different attributes even though they are grouped together, and the order of the attributes is not important.
  Unlike structured data, which represents data as a single-layer structured data type that can only have a flat schema. Structured types can be further nested within the schema of another structured type and therefore the top-level structured type can have hierarchies (e.g., array(array(int))).

In an implementation, semi-structured data is stored in the following data types:
  ARRAY: similar to an array in other languages, or an array in JSON.
  OBJECT: similar to a JSON object, also called a "dictionary", "hash", or "map" in many languages. This contains key-value pairs.

VARIANT: a data type that can hold a value of any other data type (including ARRAY and OBJECT). VARIANT is used to build and store hierarchical data.

Embodiments of the subject technology introduce structured type support in the query language and throughout the rest of the subject system. The following discussion focuses on enabling structured types at the language level.

The following discussion relates to type definition syntax.

In an implementation, type definition syntax is extended to support structured array, object, and map types as follows:

```
type ::= userDefinedType | nonUserDefinedType
userDefinedType ::= Identifier | intervalType
nonUserDefinedType ::= primitiveType | stringType | binaryType
  | numberType | timestampType | arrayType | objectType | mapType
  | variantType
arrayType ::= 'ARRAY' ( '(' arrayContentType ')' )?
  arrayContentType ::= type notNullConstraint?
objectType ::= 'OBJECT' ( '(' objectContentType? ')' )?
objectContentType ::= objectField ( ',' objectField ) *
objectField ::= columnIdentifier type notNullConstraint?
mapType ::= 'MAP' '(' mapContentType ')'
mapContentType ::= mapKeyType ',' mapValueType
mapKeyType ::= type
mapValueType ::= type notNullConstraint?
notNullConstraint ::= 'NOT' 'NULL'
```

If arrayContentType or objectContentType is specified then the type is considered structured, aka 'typed' (a typed array or a typed object), otherwise it's 'untyped' (aka semi-structured). Therefore the existing ARRAY, OBJECT and VARIANT types are semi-structured.

A semi-structured OBJECT/ARRAY/VARIANT type can be used in the content definition of a typed object/array, or as a value type in a map. e.g., OBJECT(name VARCHAR, address VARIANT), MAP(VARCHAR, VARIANT)

In an implementation, a semi-structured OBJECT/ARRAY/VARIANT value cannot contain a value of a structured type. In another embodiment, array/object constructor functions and literal expressions that produce semi-structured values automatically convert structured value inputs into semi-structured values. This will be further discussed in the constructor function section below.

In an embodiment, the use of objectContentType is optional in the objectType definition. If not specified, then the defined type is the empty typed object: OBJECT( ). The empty OBJECT( ) type is different from the OBJECT type. The former is a structured type that only matches objects with no fields, while the latter matches any semi-structured object.

Field names and field order are part of a structured object type. Each field in a structured object type should have a name. In an implementation, anonymous fields are not supported, and duplicate field names are not allowed. Two typed objects are not equal if their fields are not in the same order. This topic is further discussed herein.

Map types require content type specification and therefore are always structured. In an implementation, maps with various key types are supported.

Map keys cannot be NULL, therefore map key type definition does not support NOT NULL constraint. NOT NULL is assumed by default and cannot be overridden. Map values can be NULL, therefore NOT NULL constraint supported in the map value type definition.

For the discussion herein, the INTEGER type is utilized to represent any NUMBER type with scale 0 in MAP declarations. Moreover, '?' is used instead of the type name in MAP declarations to indicate that the value type can be any type.

NOT NULL constraints are applicable to array element types, object field types and map value types. In all these cases, NOT NULL indicates that values of those types cannot be NULL. e.g., an array that does not contain NULL elements, a map that does not contain NULL values, or an object field that is never NULL. NOT NULL constraints are enforced when values of structured types are constructed by built-in functions and operators. Accessor functions such as GET( ), GET_PATH( ) can still return NULL for arrays and maps when attempting to access an array index that is out of range, or a map key that is not present in the map. For example:

GET([1,2,3]::ARRAY(INT NOT NULL), 999) returns NULL

GET({'x':1,'y':2}::MAP(VARCHAR,INT NOT NULL), 'z') returns NULL

The following discussion relates to type conversion between structured and semi-structured data types.

Type conversion between structured and semi-structured data types is supported. Users can perform it explicitly using CAST/TRY_CAST expressions, or it can be automatically introduced by the compiler (e.g., job compiler 212) following type coercion rules.

1. Cast from a structured type to its corresponding semi-structured type is allowed and always succeeds.
   If the type is ARRAY( . . . ) then its corresponding semi-structured type is ARRAY.
   If the type is OBJECT( . . . ) or MAP( . . . ) then its corresponding semi-structured type is OBJECT.
   E.g.,
   If R.c1 is a column of type ARRAY(VARCHAR) then the expression: CAST(R.c1 AS ARRAY) converts it to the semi-structured array.
   If R.c2 is a column of type OBJECT(name VARCHAR) then the expression:
   CAST(R.c2 AS OBJECT) converts it to the semi-structured object.
   If R.c3 is a column of type MAP(VARCHAR,DATE) then the expression: CAST(R.c3 AS OBJECT) converts it to the semi-structured object.
   If R.c4 is a column of type MAP(INTEGER,DATE) then the expression: CAST(R.c4 AS OBJECT) converts it to the semi-structured object.
   Object field order is lost when casting from a typed object to a semi-structured object because semi-structured objects do not preserve field order.
   Casting MAP(INTEGER,?) to OBJECT converts numeric map keys into string field names in the output object. This conversion always succeeds.
   If a source field value is NULL then it's converted into a JSON null value in the output object. the NULL to JSON null conversion only applies when casting to a semi-structured object because field values cannot be NULL in a semi-structured object. On the other hand, semi-structured array elements can either be NULL or JSON null, so no conversion is performed when casting to semi-structured arrays.
2. Cast from a structured type to the VARIANT type is allowed and always succeeds. E.g.,
   If R.c1 is a column of type ARRAY(VARCHAR) then the expression: CAST(R.c1 AS VARIANT) converts it to the variant holding a semi-structured array.
   If R.c2 is a column of type OBJECT(name VARCHAR) then the expression: CAST(R.c2 AS VARIANT) converts it to the variant holding a semi-structured object.

If R.c3 is a column of type MAP(VARCHAR,DATE) then the expression: CAST(R.c3 AS VARIANT) converts it to the variant holding a semi-structured object.

If R.c4 is a column of type MAP(INTEGER,DATE) then the expression: CAST(R.c4 AS VARIANT) converts it to the variant holding a semi-structured object.

If a source field value is NULL then it's converted into a JSON null value in the output object.

3. Cast from a semi-structured type to a structured type is allowed but might result in a runtime error if input data does not match the target type.
   A semi-structured ARRAY can be cast to a structured ARRAY
   A semi-structured OBJECT can be cast to a structured OBJECT or to a MAP
   A VARIANT can be cast to a structured ARRAY, OBJECT or a MAP
E.g.,

---

- If R.c1 is a column of type ARRAY and its value is [1,2,3] then the expression CAST(R.c1 AS ARRAY(NUMBER)) succeeds and produces the value of type ARRAY(NUMBER),
- If R.c2 is a column of type OBJECT and its value is {'city': 'San Mateo', 'state': 'CA' }
then the expression
CAST(R.c2 AS OBJECT(city VARCHAR, state VARCHAR)) succeeds and produces the value of type
OBJECT(city VARCHAR, state VARCHAR)
- If R.c3 is a column of type OBJECT and its value is {'city': 'San Mateo', 'state': 'CA' }
the expression
CAST(R.c3 AS MAP(VARCHAR, VARCHAR))
succeeds and produces the value of type
MAP(VARCHAR, VARCHAR)

---

Cast from a semi-structured array to a structured array works as follows. Each element of the input array is cast to the item type of the output array. If the element cannot be cast to the target type then the cast operation fails. If the element is NULL and the target type has NOT NULL constraint then the cast operation fails. If the element is a JSON null value and the target type does not support JSON nulls (i.e. the target type is not VARIANT, ARRAY, or OBJECT) then the item is converted into NULL (this conversion fails in the target type has NOT NULL constraint)
E.g.,
   If R.c1 is a column of type ARRAY and its value is [1,2,3] then the expression CAST(R.c1 AS ARRAY (VARCHAR)) succeeds and produces the value ['1', '2','3'] of type ARRAY(VARCHAR)
   If R.c2 is a column of type ARRAY and its value is ['a','b','c'] then the expression CAST(R.c2 AS ARRAY(NUMBER)) fails
   If R.c3 is a column of type ARRAY and its value is [1,NULL,2] then the expression CAST(R.c3 AS ARRAY(VARCHAR NOT NULL)) fails
Cast from a semi-structured object to a structured object works as follows. The subject system iterates through the list of fields specified by the target object type. For each field, a check is performed to determine if a field with the same name is present in the input object. If the field is found in the input object, then the value of that field is cast to the target field type. If there are fields in the input object that were not visited (because the target object type did not declare them), then the cast fails. If the field is a JSON null value and the target type does not support JSON nulls (i.e. the target type is not VARIANT, ARRAY, or OBJECT) then the field value is converted into NULL (this conversion fails in the target field type has NOT NULL constraint).
E.g.,

---

- If R.c1 is a column of type OBJECT and its value is {'order_id': 1, 'ship_date': '2022-08-26' }
then the expression
CAST(R.c1 AS OBJECT(order_id VARCHAR, ship_date DATE))
succeeds and produces the value
{ 'order_id': '1', 'ship_date': 2022-08-26 }
of type OBJECT(order_id VARCHAR, ship_date DATE)
- If R.c2 is a column of type OBJECT and its value is {'city': 'San Mateo', 'state': 'CA' }
then the expression
CAST(R.c2 AS OBJECT(city VARCHAR, state VARCHAR, zip_code VARCHAR))
fails

---

Cast from a semi-structured object to a structured map works as follows. The subject technology iterates through the fields of the input object and creates a map entry for each object field. If the map key type is not VARCHAR then the field name is cast to the map key type. The field value is cast to the map value type. If the field value is a JSON null value and the target value type does not support JSON nulls (i.e. the target value type is not VARIANT, ARRAY, or OBJECT) then the field value is converted into NULL (this conversion fails in the target field type has NOT NULL constraint).
E.g.,

---

- If R.c1 is a column of type OBJECT and its value is
{'order_id': 1, 'ship_date': '2022-08-26' }
then the expression
CAST(R.c1 AS MAP(VARCHAR, VARCHAR))
succeeds and produces map value
{ 'order_id'->'1', 'ship_date'->'2022-08-26' }
- If R.c2 is a column of type OBJECT and its value is
{'order_id': 1, 'ship_date': '2022-08-26' }
then the expression
CAST(R.c2 AS MAP(VARCHAR,DATE))
fails because order_id's value 1 cannot be cast to DATE
- If R.c3 is a column of type OBJECT and its value is
{'order_id': 1, 'zip_code': NULL }
then the expression
CAST(R.c3 AS MAP(VARCHAR,NUMBER NOT NULL)) fails
- If R.c4 is a column of type OBJECT and its value is
{'1': '2022-09-01', '2': '2022-10-01', '3':'2022-11-01' }
then the expression
CAST(R.c4 AS MAP(INTEGER,DATE)
succeeds and produces map value
{ 0->'2022-09-01'::date,
  1->'2022-10-01'::date,
    2->'2022-11-01'::date }

---

4. Casting between two structured types is supported in two modes. The default ('regular') mode is supported for arrays, objects and maps. The operation in this mode is logically equivalent to casting the input value to the corresponding semi-structured value (ARRAY( . . . )→ARRAY, OBJECT( . . . ) →OBJECT, MAP( . . . )→OBJECT), then casting that semi-structured value into the target structured type. The implementation may optimize this into a single-step operation.
The following type combinations are supported
ARRAY( . . . )→ARRAY( . . . )
OBJECT( . . . )→OBJECT( . . . ), OBJECT( . . . )→MAP( . . . )
MAP( . . . )→MAP( . . . )
MAP( . . . )→OBJECT( . . . )

Cast may fail at compile time if the compiler (e.g., job compiler 212) can prove that it can never succeed. E.g.,

```
- CAST(
    CAST([1,2,3] AS
    ARRAY(NUMBER)) AS
    ARRAY(VARCHAR)
  ) → succeeds and produces ['1','2','3'] of type ARRAY(VARCHAR)
- CAST(
    CAST([TRUE, FALSE] AS
    ARRAY(BOOLEAN)) AS
    ARRAY(DATE)
  ) → fails (possibly with a compile time error)
- Object field reordering use-case
  CAST(
    {'city': 'San Mateo','state': 'CA'}
      ::OBJECT(city VARCHAR, state
    VARCHAR) AS OBJECT(state
    VARCHAR, city VARCHAR)
  )
  → {'state': 'CA', 'city': 'San Mateo'}::OBJECT(
  state VARCHAR, city VARCHAR)
```

The second mode is 'rename-fields' which is only available when casting between two structured objects:
CAST(expr AS OBJECT(field1 type1, field2 type2, . . . ) RENAME FIELDS)
The FIELDS token is optional. Only RENAME must be specified to enable this mode.

In this mode the input object's field names are ignored and field values are casted into the target type in the order in which they appear in the input type. This mode can be used to rename some fields in a structured object, or to create an object with completely different field names.

In an embodiment, RENAME FIELDS modifier is allowed even when the input type is structured ARRAY or MAP because they may contain nested structured objects in them. RENAME FIELDS applies to all structured object types even those nested in other types. E.g.,

```
- Create an object with completely different fields
CAST(
{'city':'San Mateo','state': 'CA'}
::OBJECT(city VARCHAR, state VARCHAR)
AS OBJECT(city_name VARCHAR, state_name VARCHAR)
RENAME FIELDS )
→ {'city_name': 'San Mateo', 'state_name':'CA'}
::OBJECT(city_name VARCHAR, state_name VARCHAR)
```

5. TRY_CAST is extended to support conversion between two object, array, map, or variant types. These types can be structured or semi-structured. TRY_CAST returns NULL if the cast between given two types is not possible. TRY_CAST also supports RENAME FIELDS casting mode for typed objects.

The following discussion relates to type coercion.

Type coercion is an implicit type conversion, which is performed when executing DML statements, evaluating function arguments, CASE expressions and set operators, such as UNION ALL.

The existing type coercion rules are augmented to handle structured types as follows.

1. Type coercion between two structured types is allowed
   both types must be of the same kind (both are structured arrays or structured objects, or maps)
   a structured array is coercible into another structured array if its item type is coercible to the other array's item type. Coercion between primitive types inside structured types is only allowed if both types are numeric (i.e. both are the same type, possibly with different precision/scale, or NUMBER→FLOAT, or FLOAT→NUMBER), or both are timestamps (both are the same type, possibly with different precision, or TIMESTAMP_LTZ→TIMESTAMP_TZ, or TIMESTAMP_NTZ→TIMESTAMP_LTZ, or TIMESTAMP_NTZ→TIMESTAMP_TZ). TIMESTAMP_LTZ refers to a timestamp with a local timezone, TIMESTAMP_TZ refers to a timestamp with a timezone, and TIMESTAMP_NTZ refers to a timestamp without a timezone. This is aligned with how semi-structured values are compared in an example.
   E.g.
   ARRAY(NUMBER) is coercible into ARRAY (DOUBLE)
   ARRAY(DATE) is NOT coercible into ARRAY (NUMBER)
   a structured object is coercible into another structured object if both object types have the same number of fields, with the same name, in the same order, and each field type is coercible into the corresponding field type in the second type following the coercion rules specified for array items types above
   E.g.
   OBJECT(city VARCHAR, zipcode NUMBER) is coercible into
   OBJECT(city VARCHAR, zipcode DOUBLE)
   OBJECT(city VARCHAR, zipcode NUMBER) is NOT coercible into
   OBJECT(city VARCHAR, zipcode DATE)
   a map is coercible into another map if their key types are the same, and value types are coercible following the coercion rules specified for array items types above
   E.g.
   MAP(VARCHAR, NUMBER) is coercible into MAP(VARCHAR,DOUBLE)
   MAP(VARCHAR, NUMBER) is NOT coercible into
   MAP(NUMBER,NUMBER)
2. Type coercion between a structured type and a semi-structured type is NOT allowed.
3. Type coercion from a VARCHAR into a structured type (array, object, or map) is NOT allowed The following discussion relates to type comparison operators.

1. There is no change in the comparison semantics between two semi-structured values.
2. Comparison between a structured type and a semi-structured type is not allowed because it's not supported by the above coercion rules. (Coercion rules are used to align argument types for comparison operators).
3. Equality comparison between two structured types is allowed if they can be coerced into a single structured type. After the coercion they are compared as follows:
   If both types are arrays then their elements are compared following the approach that is used for semi-structured array comparison If both types are objects then their field values are compared following the approach that is used for semi-structured object comparison. Note, at this point the object fields are already guaranteed to be the same and in the same order, otherwise the coercion would have not succeeded.

If both types are maps then their respective keys and values are compared following the above approach for semi-structured values. Numeric keys are compared as numbers, not as varchars.

It's a compile-time error if two structured types are not comparable.

E.g.,

| Operands | | | Result |
|---|---|---|---|
| [1,2]::ARRAY(NUMBER) | = | [1,2]::ARRAY(DOUBLE) | TRUE (both element types are numeric) |
| [1,2]::ARRAY(NUMBER) | = | ['1','2']::ARRAY(VARCHAR) | compile-time error. (coercion did not succeed) |
| [[1,2],[3,4]::ARRAY(ARRAY(NUMBER)) | = | [1,2],[3,4]::ARRAY(ARRAY(DOUBLE)) | TRUE (numeric types) |
| {'x':'a','y':10}:: OBJECT( x VARCHAR, y NUMBER ) | = | {'x':'a','y':10}:: OBJECT( x VARCHAR,y DOUBLE ) | TRUE (numeric types) |
| {'x':'a','y': 10}:: OBJECT( x VARCHAR, y DOUBLE ) | = | {'x':'a','y':10}:: OBJECT( y DOUBLE, x VARCHAR ) | compile-time error (different field order, coercion did not succeed) |
| [1,2],[3,4]::ARRAY(ARRAY(NUMBER)) | = | [[1,2],[3,4]]::ARRAY(ARRAY) | compile-time error. one element type is typed array, another one is semi-structured array. Structured - semi-structured coercion is not allowed (see below) |
| {'x':10,'y':20}::MAP(VARCHAR,NUMBER) | = | {'x':10,'y':20}::MAP(VARCHAR,DOUBLE) | TRUE (both value types are numeric) |
| {'x':10,'y':20}::MAP(VARCHAR,NUMBER) | = | {'x':'10','y':'20'}::MAP(VARCHAR, VARCHAR) | compile-time error. (coercion did not succeed) |

4. Inequality comparison between two structured types can be implemented as discussed in the following. Ordering of structured types refer to the inequality comparison rule (e.g. <, >, >=, <=) for structured data types. An inequality check can be applied between values of the same data type. For example, expressions that have the same logical type and the same schema where the field names occur in the same order with the same corresponding field data types. The compiler rejects queries if 2 columns that users compare against do not have the same data type. XP (e.g., execution node) performs comparisons assuming the data types equivalence. In an implementation, for the semantic of the comparison rule, there are 2 options.

Option 1: conduct comparison for fields in the order in the schema e.g. {'a':2,'b':1}::OBJECT(b INT,a INT)<{'a':1,'b':2}::OBJECT(b INT, a INT)

Option 2: conduct comparison for fields in the alphabetical order e.g. {'a':2,'b':1}::OBJECT(b INT,a INT)>{'a':1,'b':2}::OBJECT(b INT, a INT)

The following discussion relates to set operators and case expressions.

Structured types can be used in branches of UNION ALL, other set operators, and CASE expressions. The output type in those cases is computed by coercing structured types from all branches into a single structured type following the above coercion rules.

E.g.,

SELECT [1,2]::ARRAY(NUMBER) UNION ALL [3,4]::ARRAY(DOUBLE) →
[1,2]::ARRAY(DOUBLE), [3,4]::ARRAY(DOUBLE)

The following discussion relates to impact on built-in functions.

The subject system extends existing array/object built-in functions so they could operate on typed arrays and objects. The key design principles are the following:

These functions continue to accept semi-structured arguments and are extended to also accept typed arguments These functions perform appropriate operations when their arguments are typed values.

Transformation functions should preserve the structuredness of the input value. e.g., if the input is typed then the output should also be typed, if the input is semi-structured then the output is semi-structured. This does not apply to constructor functions in an example, however, in other embodiments, there could be exceptions where it does apply to constructor functions.

Additional built-in functions are also provided to operate on maps. In an example, built-in functions can be divided into these categories:

functions that create arrays, or objects (constructor functions)
functions that extract data from arrays, objects, or maps (accessor functions)
functions that transform arrays, objects, or maps (transformation functions).
functions that lookup data in an array or map (lookup functions)
treat-as functions The following relates to array/object constructor functions.

The constructor functions are:

| Array constructor functions | Object constructor functions |
| --- | --- |
| ARRAY_CONSTRUCT( ), ARRAY_CONSTRUCT_COMPACT( ), ARRAY_AGG( ), TO_ARRAY( ) | OBJECT_CONSTRUCT( ), OBJECT_CONSTRUCT_KEEP_NULL( ), OBJECT_AGG( ), TO_OBJECT( ) |

The general rule for constructor functions is that they continue to produce semi-structured arrays and objects. The explicit cast operator must be used to convert the produced value into a typed one.

| Expression | Return type | |
| --- | --- | --- |
| ARRAY_CONSTRUCT(1,2,3) | Untyped | ARRAY |
| ARRAY_CONSTRUCT(1,2,3)::ARRAY(NUMBER) | Typed | ARRAY(NUMBER) |
| OBJECT_CONSTRUCT( 'city','San Mateo','state','CA') | Untyped | OBJECT |
| OBJECT_CONSTRUCT( 'city','San Mateo','state','CA' )::OBJECT(city VARCHAR,state VARCHAR) | Typed | OBJECT( city VARCHAR, state VARCHAR ) |
| OBJECT_CONSTRUCT( ) | Untyped | OBJECT |
| OBJECT_CONSTRUCT( )::OBJECT( ) | Typed | OBJECT( ) |

It's an error if a value of a structured type is passed to a semi-structured array/object constructor function, because structured to semi-structured coercion are not allowed.

The following relates to array/object constructor literal expressions.

Array/object constructor literal expressions continue to produce semi-structured values. If a typed value is needed then their result must be explicitly cast to that type.

| Expression | Return type | |
| --- | --- | --- |
| [1,2,3] | Untyped array | ARRAY |
| CAST([1,2,3] AS ARRAY(NUMBER)) | Typed array | ARRAY(NUMBER) |
| [1,2,3]::ARRAY(NUMBER) | Typed array | ARRAY(NUMBER) |
| {'city':'San Mateo','state':'CA'} | Untyped object | OBJECT |
| CAST( {'city':'San Mateo','state':'CA'} AS OBJECT(city VARCHAR,state VARCHAR) ) | Typed object | OBJECT( city VARCHAR, state VARCHAR ) |
| {'city':'San Mateo','state':'CA'} :OBJECT(city VARCHAR,state VARCHAR) | Typed object | OBJECT( city VARCHAR, state VARCHAR ) |

It's an error if a value of a structured type is passed to a semi-structured array/object constructor literal expression, because structured to semi-structured coercion is not allowed.

The following relates to map construction.

Users can create maps by explicitly casting from objects. E.g.,

---
- OBJECT_CONSTRUCT(
    'city','San Mateo','state','CA')::MAP(VARCHAR,VARCHAR)
    → produces map value {'city'->'San Mateo','state'->'CA'}
- {'city':'San Mateo','state':'CA'}::MAP(VARCHAR,VARCHAR)
    → produces map value {'city'->'San Mateo','state'->'CA'}
---

-continued
---
- {'-10':'CA','-20':'OR'}::MAP(NUMBER,VARCHAR)
    → produces map value {-10->'CA',-20->'OR'} of type MAP(NUMBER,VARCHAR)
---

The following relates to array/object accessor functions and operators.

The accessor functions are: GET( ), GET_IGNORE_CASE( ), GET_PATH( )

The accessor operators are: [ ].

The accessor operators are compiled into the above accessor functions.

Accessor functions extract an element from an array or a field value from an object. Their invocation syntax remains the same. If an argument is a semi-structured array/object/variant then these functions continue to return a value of type VARIANT. If the argument is a typed array/object/map then these functions return a value of the actual content type. E.g., ARRAY_CONSTRUCT('San Mateo')[0] accesses the semi-structured array, therefore returns 'San Mateo' as a value of type VARIANT CAST(ARRAY_CONSTRUCT('San Mateo') AS ARRAY(VARCHAR))[0] accesses the typed array, returns 'San Mateo' as a value of type VARCHAR If an accessor function reads a field from a typed object, then the field name/path should be a constant at compile time. It's a compile time error If the field name/path is not a constant.

E.g.,

If R.c1 is a column of type OBJECT(city VARCHAR, state VARCHAR) and R.c2 is a column of type VARCHAR then the following expression raises an error:
SELECT GET(R.c1, R.c2) FROM R If an input object does not contain a given field then these functions continue to return NULL if input is semi-structured, or fail at compile time if the argument is typed.

E.g.,

---
-   GET( {'city':'San Mateo','state':'CA'}, 'zip_code')
    → NULL (no 'zip_code' field, semi-structured input)
-   GET(
---

-continued
---
{'city':'San Mateo','state':'CA'}
    ::OBJECT(city VARCHAR,state VARCHAR)
,
'zip_code' )
→ compile-time error (no 'zip_code' field, typed input)
---

Accessor functions on maps do not require key expression to be a constant. The type of the key expression must be the same as to the map key type.

If given key is not found in the input map then these functions/operators return NULL E.g., ---
- GET( {'city':'San Mateo','state':'CA'}::MAP(VARCHAR,VARCHAR), 'zip_code')
→ NULL (no 'zip_code' key)
- GET(
    {'10':'CA','20':'OR'}::MAP(NUMBER,VARCHAR), TRUE
    ) → compile-time error.given key type (BOOLEAN) is not the same asto the map key type (NUMBER)
---

The following relates to array lookup functions.

These functions are: ARRAY_CONTAINS(item, arr), ARRAY_POSITION(item, arr)

These functions rely on type comparison, therefore when these functions operate on a typed array(ARRAY(T1)), then the input item type must be comparable to T1 following the above type comparison rules (type coercion only within numeric/timestamp types). It's a compile-time error if the input item type is not comparable with T1.

When these functions operate on a semi-structured array, the input item must not be a typed value (compile-time error) because semi-structured to structured comparison is not allowed in an implementation.

These functions follow SQL's NULL-on-NULL semantics.

E.g.,

---
-   ARRAY_CONTAINS(1, [1,2]::ARRAY(DOUBLE))
    → TRUE
-   ARRAY_CONTAINS('1', [1,2]::ARRAY(DOUBLE))
    → compile time error (incomparable types)
-   ARRAY_CONTAINS([1,2]::ARRAY(NUMBER), [[1,2],[3,4]])
    → compile time error (semi-structured to structured comparison not allowed)
-   ARRAY_CONTAINS(NULL, [1,NULL]::ARRAY(DOUBLE)
    → NULL (SQL's NULL-on-NULL semantics)
---

ARRAYS_OVERLAP(arr1,arr2)

Arguments arr1 and arr2 must be either both semi-structured or structured. If semi-structured then the function continues to work as is. If both arguments are typed arrays then the element type of arr2 must be comparable to the element type of arr1 following the above type comparison rules.

Compile-time error otherwise.

E.g.,

---
- ARRAYS_OVERLAP([1,2]::ARRAY(DOUBLE),
[2,3]::ARRAY(NUMBER)) → TRUE (element types are comparable)
- ARRAYS_OVERLAP([1,2]::ARRAY(DOUBLE),
['2','3']::ARRAY(VARCHAR)) → compile time error (incomparable element types)
- ARRAYS_OVERLAP([1,2]::ARRAY(DOUBLE), [2,3])
---

-continued

→ compile time error (semi-structured to structured comparison not allowed)

The following relates to map lookup function.

MAP_CONTAINS_KEY(key,map)→BOOLEAN

Returns TRUE if the given map contains the key, or FALSE otherwise. The type of the key expression must be comparable with the map's key type following the above comparison rules (compile-time error otherwise) This function follows SQL's NULL-on-NULL semantics. E.g.,

- MAP_CONTAINS_KEY('CA',
  {'CA':10,'OR':20}::MAP(VARCHAR,NUMBER))
  → TRUE
- MAP_CONTAINS_KEY('10',
  {'10':'CA','20':'OR'}::MAP(NUMBER,VARCHAR))
  → compile time error (incomparable key types: VARCHAR and NUMBER)
- MAP_CONTAINS_KEY(NULL,
  {'CA':10,'OR':20}::MAP(VARCHAR,NUMBER))
  → NULL The following relates to array transformation functions.

These functions can be divided into 2 groups:

1. Single array transformation functions. These functions accept a single array argument and transform it: ARRAY_APPEND( ), ARRAY_INSERT( ), ARRAY_PREPEND( ), ARRAY_COMPACT( ), ARRAY_SLICE( ), ARRAY_UNION_AGG( ), ARRAY_UNIQUE_AGG( )

2. Multi-array transformation functions. These functions accept two or more array arguments and produce a single output array: ARRAY_CAT( ), ARRAY_INTERSECTION( ), Single array transformation functions preserve the type of their input array. Several of these functions add an element to the input array: ARRAY_APPEND( ), ARRAY_INSERT( ), ARRAY_PREPEND( ), If the argument type is a typed array then the input item is coerced to the array's element type following the type coercion rules.

E.g.,

- ARRAY_APPEND( [1,2]::ARRAY(DOUBLE), 3::NUMBER )
  → [1,2,3]::ARRAY(DOUBLE)
- ARRAY_APPEND( [1,2]::ARRAY(DOUBLE), '3' )
  → [1,2,3]::ARRAY(DOUBLE)
  Allowed because of coercing VARCHAR to DOUBLE as primitive types
- ARRAY_APPEND( [1,2]::ARRAY(NUMBER), '2022-02-02'::DATE )
  → error. cannot coerce DATE to NUMBER It's an error if the argument is a semi-structured array and the input item is a value of a structured type because structured to semi-structured coercion is not allowed.

ARRAY_CAT(arr1, arr2) concatenates input arrays. The second array type is coerced into the first array type. The output type is the type of the first argument. Argument types must either be both structured or both semi-structured (as per coercion rules).

E.g.,

- ARRAY_CAT( [1,2]::ARRAY(NUMBER),
  [3,4]::ARRAY(DOUBLE) ) → [1,2,3,4]::ARRAY(NUMBER)
- ARRAY_CAT( [1,2]::ARRAY(NUMBER),
  ['3','4']::ARRAY(VARCHAR) )
  → error. cannot coerce ARRAY(VARCHAR) to ARRAY(NUMBER)
- ARRAY_CAT( [1,2]::ARRAY(NUMBER), ['3','4'] )
  → error. cannot coerce ARRAY to ARRAY(NUMBER)
- ARRAY_CAT( [1,2], ['3','4']:ARRAY(VARCHAR) )
  → error. cannot coerce ARRAY(VARCHAR) to ARRAY ARRAY_INTERSECTION(arr1, arr2) returns items from arr1 that are also contained in arr2. The return type is the same as the type of arr1. Arguments arr1 and arr2 must either be both semi-structured or structured. The function relies on type comparison, therefore the content type of arr2 must be comparable to the content type of arr1 following the above type comparison rules (compile-time error otherwise).

E.g.,

- ARRAY_INTERSECTION( [1,2]::ARRAY(NUMBER),
  [2,3]::ARRAY(DOUBLE)
  )
  → [2]::ARRAY(NUMBER)
- ARRAY_INTERSECTION( [1,2]::ARRAY(NUMBER),
  ['2','3']::ARRAY(VARCHAR)
  )
  → compile-time error (incomparable types)
- ARRAY_INTERSECTION( [1,2], [3,4]::ARRAY(NUMBER) )
  → compile time error (incomparable types:semi-structured / structured)

The following relates to object transformation functions. These functions transform their input object: OBJECT_DELETE( ), OBJECT_INSERT( ), OBJECT_PICK( )

If an argument of an object transformation function is a structured object then it's transformed into another structured object. The field name arguments (keys) must be constants of type VARCHAR, to enable computing the structured output type at compile-time (compile-time error if those arguments are not constants).

OBJECT_DELETE(obj,key1,key2, . . . keyN)

The output type is a structured type produced from the input object type by removing the specified fields. It's a compile-time error if key arguments are not constants, or do not correspond to field names in the input object type.

E.g.,

- OBJECT_DELETE(
  {'city':'San Mateo','state':'CA'}
  ::OBJECT(city VARCHAR,state VARCHAR)
  ,
  'city')
  → {'state':'CA'}::OBJECT(state VARCHAR)
- OBJECT_DELETE(
  {'city':'San Mateo','state':'CA'}
  ::OBJECT(city VARCHAR,state VARCHAR)
  ,
  'city', 'state')
  → { }:OBJECT( ) (empty structured object)
- OBJECT_DELETE(
  {'city':'San Mateo','state':'CA'}
  ::OBJECT(city VARCHAR,state VARCHAR)
  ,

```
R.column_1)
→ compile time error (field name argument is not a constant)
- OBJECT_DELETE(
{'city':'San Mateo','state':'CA'}
::OBJECT(city VARCHAR,state VARCHAR)
,
'zip_code')
→ compile time error (field does not exist)
```

OBJECT_INSERT(obj,key,value,[updateFlag])

If the input object is structured then key and updateFlag arguments must be constants (compile-time error otherwise). The function works in one of the two modes depending on the updateFlag value: INSERT mode (updateFlag-false) or UPDATE mode (updateFlag=true)

In the INSERT mode performing a check that the object input type does not already contain the given field (compile-time error if it does). The output type is the input object type augmented with the new field. The type of the new field is the same as the type of the value argument.

In the UPDATE mode performing a check that the object input type already contains the given field (compile-time error if it does not). Then coercing the input value argument to that field's type following the above coercion rules. The output type in the UPDATE mode is the same as the input type.

E.g.,

```
- INSERT mode
OBJECT_INSERT(
{'city':'San Mateo','state':'CA'}::OBJECT( city VARCHAR,state VARCHAR) ,
'zip_code', 94402::DOUBLE, false))
→ {'city':'San Mateo','state':'CA','zip_code':94402}::OBJECT( city VARCHAR,state VARCHAR,zip_code DOUBLE)
- UPDATE mode (with type coercion VARCHAR→NUMBER)
OBJECT_INSERT(
{'city':'San Mateo','state':'CA','zip_code':94401}::OBJECT( city VARCHAR,state VARCHAR,zip_code NUMBER)
, 'zip_code', '94402', true)
→ {'city':'San Mateo','state':'CA','zip_code':94402}::OBJECT( city VARCHAR,state VARCHAR,zip_code NUMBER)
``` fields from the input object type. It's a compile-time error if a field is not found in the input object type.

E.g.,

```
- OBJECT_PICK(
{'city':'San Mateo','state':'CA','zip_code':94402}
::OBJECT(city VARCHAR,state VARCHAR,zip_code DOUBLE)
,
'city', 'state')
→ {'city':'San Mateo','state':'CA' }::OBJECT( city VARCHAR,state VARCHAR)
```

OBJECT_PICK(obj,array)

If the input object is structured then raise compile-time error.

Map transformation functions

MAP_DELETE(map,key1,key2, . . . keyN)

Deletes keys from a given map. Key expressions do not have to be constants. In an implementation, key expression types are the same as the map key type. The output type is the same as the input map type. Keys that are not found in the map are ignored by this function.

E.g.,

```
- MAP_DELETE(
{'city':'San Mateo','state':'CA'}::MAP(VARCHAR,VARCHAR)
,
'city')
→ {'state'->'CA'} of type MAP(VARCHAR,VARCHAR)
- MAP_DELETE(
{'10':'CA','20':'OR'}::MAP(NUMBER,VARCHAR)
,'10')
→ compile-time error (incomparable key types:NUMBER and VARCHAR)
MAP_INSERT(map, key, value, [updateFlag])
```

Similar to OBJECT_INSERT( ), but applies to map values.

The key expression does not have to be a constant. Its type must be the same as the map key type. The value expression is coerced into the map value type.

Follows SQL's NULL-on-NULL semantics.

E.g.,

```
- INSERT mode
MAP_INSERT(
{'city':'San Mateo','state':'CA'}::MAP(VARCHAR,VARCHAR)
, 'zip_code', '94402', false))
→ {'city'->'San Mateo','state'->'CA','zip_code'->'94402'}
of type MAP(VARCHAR,VARCHAR)
- UPDATE mode (with type coercion NUMBER→VARCHAR) MAP_INSERT(
{'city':'San Mateo','state':'CA','zip_code':'94401'}::MAP( VARCHAR,VARCHAR)
, 'zip_code', 94402, true)
→ {'city'->'San Mateo','state'->'CA','zip_code->'94402'}
of type MAP(VARCHAR,VARCHAR)
```

Allowed because of coercing VARCHAR to NUMBER as primitive types

OBJECT_PICK(obj,key1,key2, . . . keyN)

If the input object is structured then key arguments must be constants of type VARCHAR (compile-time error otherwise). The output type is a structured object, constructed by projecting specified Allowed because of coercing NUMBER to VARCHAR as primitive types MAP_CAT(map1,map2)

Concatenates two maps into a single one. The return type of this function is the type of map1. map2 is coerced into the map1 type following the coercion rules. Then the maps are merged into a single one. If both map1 and map2 have a value with the same key then the output map contains the value from map2.

E.g.,

```
- MAP_CAT(
    {'city':'San Mateo','state':'CA'}::MAP(VARCHAR,VARCHAR),
    {'zip_code':'94402'}::MAP
  )
  → {'city'->'San Mateo','state'->'CA','zip_code'->94402}
    of type MAP(VARCHAR,VARCHAR)
- MAP_CAT(
    {'city':'San Mateo','state':'CA'}::MAP(VARCHAR,VARCHAR),
    {'city':'Bellevue','state':'WA'}::MAP(VARCHAR,VARCHAR)
  )
  → {'city'->'Bellevue','state'->'WA'}
    of type MAP(VARCHAR,VARCHAR)
- MAP_CAT(
    {'city':'San Mateo','state':'CA'}::MAP(VARCHAR,VARCHAR),
    {'10':'100'}::MAP(NUMBER,NUMBER)
  )
  → error cannot coerce MAP(NUMBER,NUMBER) to
    MAP(VARCHAR,VARCHAR)
```

MAP_PICK(map,key1,key2, . . . keyN)

The output is a map, constructed by projecting specified keys and their corresponding values from the input map. The return type is the same as the input map type. Key argument types must be comparable to the map key type (compile-time error otherwise). If a specified key is not found then it's ignored.

E.g.,

```
- MAP_PICK(
    {'city':'San Mateo','state':'CA','zip_code':'94402'}
    ::MAP(VARCHAR,VARCHAR),
    'city', 'state')
  → {'city'->'San Mateo','state'->'CA' } of type
    MAP(VARCHAR,VARCHAR)
```

MAP_PICK(map,array)

Creates a map that contains all values from the input map that have keys specified by the array argument. The return type is the same as the input map type. The input array can either be semi-structured or structured. If the array is structured then its element type must be comparable with the map key type following the above comparison rules (compile-time error otherwise). If the array is semi-structured then incomparable array elements are ignored.

E.g.

```
- MAP_PICK(
    {'city':'San Mateo','state':'CA','zip_code':'94402'}
    ::MAP(VARCHAR,VARCHAR),
    ['city', 'state'])
  → {'city'->'San Mateo','state'->'CA' } of type
    MAP(VARCHAR,VARCHAR)
- MAP_PICK(
    {'city':'San Mateo','state':'CA','zip_code':'94402'}
    ::MAP(VARCHAR,VARCHAR),
    ['city', 'state', '2022-10-10'::date])
  → {'city'->'San Mateo','state'->'CA' } of type
    MAP(VARCHAR,VARCHAR)
    (incomparable array element is ignored)
- MAP_PICK(
    {'city':'San Mateo','state':'CA','zip_code':'94402'}
    ::MAP(VARCHAR,VARCHAR),
    ['city', 'state']::ARRAY(VARCHAR))
  → {'city'->'San Mateo','state'->'CA' } of type
```

```
    MAP(VARCHAR,VARCHAR)
- MAP_PICK(
    {'city':'San Mateo','state':'CA','zip_code':'94402'}
    ::MAP(VARCHAR,VARCHAR),
    [false, true]::ARRAY(BOOLEAN))
  → compile-time error
```

The following relates to type-related functions.

IS_ARRAY( ),IS_OBJECT( ),TYPE_OF( )

Not supported for structured types (compile-time error if input value has a structured type)

AS_ARRAY( ),AS_OBJECT( )

Not supported for structured types (compile-time error if input value has a structured type)

TO_ARRAY( ),TO_OBJECT( ),TO_VARIANT( )

Supports input value of a structured type (including maps). Convert to unstructured, following casting rules from structured to semi-structured.

E.g.,

```
- Convert structured value to semi-structured
  TO_ARRAY( [1,2]::ARRAY(NUMBER) )
  → [1,2]
```

The following relates to flatten table function.

The flatten( ) table function accepts structured arrays/objects/maps as inputs.

If, after applying the PATH, the value being flattened is a structured array and RECURSIVE=FALSE then the output VALUE column has the array item type.

If, after applying the PATH, the value being flattened is a structured map and RECURSIVE=FALSE then the output VALUE column has the map value type and the output KEY column has the map key type.

Otherwise the VALUE column is of type VARIANT.

This behavior is an exception to the general approach of returning a structured type if the input was structured. In an example, flatten( ) returns values of mixed types in most cases (flattening objects, or recursive flattening). The only cases where it could produce a single output type is a non-recursive flattening of structured arrays or maps which is a special case here.

If, after applying the PATH, the value being flattened is a structured map then it's undefined in which order its key/values are returned by this function.

E.g.,

| - | SELECT t.VALUE FROM TABLE( flatten(input => [1,2]::ARRAY(DOUBLE))) t → |
|---|---|
| | VALUE (DOUBLE) |
| | 1 |
| | 2 |
| - | SELECT t.KEY, t.VALUE FROM TABLE( flatten(input => {'1':100.5,'2':200.5]::MAP(NUMBER,DOUBLE))) t → ( the order is undefined) |

| KEY<br>(NUMBER) | VALUE<br>(DOUBLE) |
|---|---|
| 1 | 100.5 |
| 2 | 200.5 |

The following relates to other functions.
ARRAY_SIZE(array) Supports structured arrays. E.g.

```
- ARRAY_SIZE( ['a','b','c']::ARRAY(VARCHAR) )
→ 3
```

MAP_SIZE(map)

Returns number of entries in a given map. E.g.

```
- MAP_SIZE(
{'city':'San Mateo','state':'CA','zip_code':'94402'}
::MAP(VARCHAR,VARCHAR)
)
→ 3
```

OBJECT_KEYS(object)

Supports structured objects.
Returns object keys as a structured array(ARRAY(VARCHAR)), if the input is a structured object. Returns object keys as a semi-structured array(ARRAY), if the input is semi-structured.
E.g.,

```
- Input is a structured object
OBJECT_KEYS(
{'city':'San Mateo','state':'CA','zip_code':94402}
::OBJECT(city VARCHAR,state VARCHAR,zip_code NUMBER)
)
→ ['city', 'state', 'zip_code']::ARRAY(VARCHAR)
- Input is a semi-structured object
OBJECT_KEYS(
{'city':'San Mateo','state':'CA','zip_code':94402}
)
→ ['city', 'state', 'zip_code']
```

MAP_KEYS(map)

Returns map keys as a structured array. The order of the keys in the output array is undefined.
E.g.

```
- MAP_KEYS(
{'1':100, '2':200, '3':300}
::MAP(NUMBER,NUMBER)
)
→ [1,2,3]::ARRAY(NUMBER) (the order is undefined)
```

PARSE_JSON(varchar)

Continues to produce a semi-structured value (VARIANT)

The following discussion relates to implementation details for structured types in embodiments of the subject technology.

The following discussion relates to results and clients.

In an implementation, query results containing structured types need to be fetched by clients, and they also need to be understood by the query engine, e.g., as part of ResultScan operations (e.g., returning a result set of a previous command as if the result was a table). In an implementation, to ensure Structured Type is supported by all clients, query results are represented using a JSON string format similar to how semi-structured types are represented. Based on the structured type schemas available in the dataflow language that describes how XP (e.g., execution node) runs a query, the result RSO (rowset operator) serializes ObjectData (e.g., data related to a given object) to produce serialized stringified Jsons for each Structured Type Columns in the result; similarly, during ResultScan, the JSON String representation from the results are first parsed and then converted to ObjectData.

Beyond the JSON String representation, Structured Types in Query Results are natively supported in Arrow ResultSets (e.g., provided by Apache Arrow that is a specific format utilized for storing results). Arrow has become the default ResultSet format fetched by most clients (e.g., Python, JDBC, ODBC, Go, Spark), and Structured Types are mapped to the following Types in Arrow ResultSets during result generation: Typed Objects to StructArrays, Typed Arrays to ListArrays, and Maps to MapArrays. During reading, the Arrow ResultSets are directly mapped to ObjectData. In an embodiment, the Arrow format is also used for passing arguments to/from vectorized Python UDFs. In an implementation, the Arrow format can be used for mapping ObjectData, regardless of whether it corresponds to Structured or Semi-Structured Types.

Besides using Arrow formats, some clients such as JDBC also have native Structured Types support. JDBC has separate Types for Struct and Array (but not for Maps), so APIs in JDBC could be supported for fetching Typed Objects and Typed Arrays.

The following discussion relates to Result Serialization for Structured Types.

The structured types, when being serialized in the query result as strings, will have a slightly different stringified representation than their semi-structured counterparts. Maps are a new data type, which needs a stringified serialized format for them. Notable behaviors in result serialization are the following:

1. Structured objects will be serialized in a json-like format similar to semi-structured objects. Within the query result, fields will be serialized in the order they are specified in the schema instead of the alphabetical order of field names to convey the schema.
2. Structured arrays will be serialized in a similar manner as how semi-structured arrays are serialized. In an implementation, JSON nulls are converted to missing values which resemble SQL nulls when a semi-structured array is converted to a structured array.
3. Structured maps will be serialized in a json-like format similar to semi-structured objects, where keys and values are serialized as keys and values in a json object. For integer keys, performing a wrapping of them with quotes so that native JSON parser could understand them. The key type could still be differentiated by the client using the data type in the result metadata.

The following discussion focuses on the result serialization and deserialization of the string-ified format.

There are 2 parts to the implementation of result serialization: firstly, the compiler (e.g., job compiler 212) will add the schema of structured types to the execution plan, which is a similar mechanism to how schema are passed to cast functions. Then the execution engine (e.g., execution platform or execution node) will use the schema to serialize the query result. The logic will be implemented as an extension to semi-structured serialization. So for a structured object column, the result serialization logic will identify whether the data type of the current object is a structured or semi-structured object and apply the logic differently. If the structured schema or object? is nested or has a semi-structured field, the logic could also recurse and serialize the object at each level according to the schema.

There are 2 ways to execute a result scan.
1. If the result scan query is a simple select*query on the result set without any filter/aggregation, then the query result that's previously persisted will be directly returned to the client in a compute service manager query with the same column metadata as the previously run query.
2. If the result scan query is even slightly more complex than (1), then the result scan will be run in XP (e.g., execution platform or execution node) in an external scanner to produce a single variant column that contains an array/object with all selected columns in the result set. Then each column will be extracted from the variant and cast from the serialized format to the type of the column in the result set.

In non-arrow-native result sets, structured types are serialized as strings, meaning that logic is provided to cast from string to structured types. The steps to deserialize are first parsing the strings as semi-structured objects, then cast them to the structured type using cast functions.

For arrow-native result sets, structured types could be directly cast from the result set into ObjectData without the need to have extra steps to serialize them into strings and deserializing them back. Casting from result set to structured ObjectData will be done in the external scanner (e.g., arrow scanner). Outside of the scanner, a new internal function is introduced, which will only be used in this scenario, to extract the structured object from a variant data.

The following discussion relates to implementation details involving a given execution node.

Schemas for Structured Types are passed to execution node ("XP") workers in execution plan specifications. This is required both for execution plans that reference Structured Type columns as well as for functions such as CASTs that require knowledge of the target schemas. During execution, Structured Types are represented as ObjectData inside the Query Engine, and efficient encoding algorithms are used for storing Structured Types in Parquet and FDN files generated by the subject system. In an example, Parquet refers to an open file format (e.g., column-oriented data file format for efficient data storage and retrieval, which provides efficient data compression and encoding schemes). During writing, the Insert operator transforms the internal Object representation into Dremel Encoding and also writes out EPs (e.g., expression properties representing metadata information such as min/max values, and other properties, as discussed previously) for Structured Type fields.

In an embodiment, reading of Structured Types involves constructing OpNodes in the Scan Plan. New OpNodes StructCombine, ListCombine, and MapCombine are introduced to handle Struct, List (Arrays) and Maps, where each OpNode constructs Object data fully for its node and provides the Object data along with the definition and repetition levels to the next node. Construction of Struct, Map or Arrays can be skipped based on the Selection Vector, or depending on extraction specifications.

In an implementation, various key types are supported for Maps. A new logical type and a new ObjectData encoding codeword MAP are introduced in an execution node to guard map behavior and ensure extensibility to enable introducing more key types. String keyed maps are encoded similarly to semi-structured arrays. Integer keyed maps are encoded similarly to sparse semi-structured arrays.

The following relates to implementation details for a compiler (e.g., job compiler 212).

Structured Types are supported as native Data Types in the subject system. Three new Logical Types are introduced on behalf of Structured Types: STRUCTURED_OBJECT, STRUCTURED_ARRAY, and MAP. Type coercion rules from/to these Data Types are implemented, and internal cast functions are added to support casting from Semi-Structured to Structured Types. Structured Types can also be used as arguments to other built-in functions, and the function signatures as well as Type Inference logic has been updated to support these new types.

Similar to subcolumns, extractions on Structured type columns are represented as virtual columns and pushed down to Table Scans. These extraction expressions are also used to retrieve and populate EPs for Structured Type fields. EP-based compile-time optimizations (Data Dependent Optimizations) are critical for query performance, and these optimizations are also applicable to Structured Type columns based on the collected Structured Type EPs.

EPs for non-repeated primitive Structured Type fields are maintained in exactly the same way as for regular columns, so existing optimizations still apply after the Compiler recognizes these fields. For repeated fields such as Arrays or Maps, the EPs that exactly correspond to the extraction expression may not be collected, but EPs at the repeated field level could be expected. If such path expression EPs are available, they can be leveraged for optimizations such as pruning. However, if only field level EPs are available, some special handling would be needed to leverage the num Values property. Also, optimizations that require precise min/max values are not available for these field level EPs. For example, metadata query answering of MIN/MAX/COUNT may not leverage the repeated field EPs.

The following is a further discussion of data dependent optimization handling for structured types.

Data dependent optimization are query plan rewrite and data pruning based on the property of the underlying data suggested by the column metadata in the EP files. Some examples are constant folding, false filter rewrite, compile-time and runtime pruning. The following discusses implementations to support data dependent optimization for structured types.

Structured fields have EPs for columns in data files, which can be leveraged whenever possible for repeated and non-repeated structured fields. More specifically, this means:
  For non-repeated primitive fields, structured field EPs are utilized similar to how they are used for regular column EPs in data dependent optimization, the EPs are populated similarly, so that existing logic can handle them seamlessly.
  For repeated primitive fields, a new field num Values are populated into expression properties and compiler code needs to potentially utilize new logic for these repeated fields. E.g., when computing NDV (number of distinct values) or properties like nullability properties.

In an example, physical types of all structured fields are properly derived in a way that's similar to the regular columns even if they are inside of a structured object. This is useful for the compiler to further derive physical data types when these primitive fields are extracted and also Arrow-native result format to use a more precise result format for these primitive fields.

The following discussion relates to extraction pushdown.

The extraction pushdown of structured fields follows the logic of extraction pushdown for subcolumns where extractions on table columns are determined and pushed into scans as virtual columns. For example, the subject system pushes extraction functions on structured types such as get_Path (t1.a, 'b.c[0].d') into table scan. This allows the scanner to efficiently extract the field and allow EP to be populated only for the required fields instead of the entire object. After extractions are pushed down as virtual columns, all cases in the compiler can expect to see these pushed down expressions.

The following discussion relates to loading EPs.

EPs are loaded on demand into ExpressionProperties to be utilized by the compiler in data-dependent optimizations using the new interfaces provided by the metadata layer with the source column id, and the column ordinal or external IDbased on whether the table is a native table (e.g., based on a native or internal format of the subject system) or an Iceberg table (e.g., an open table format for huge analytic datasets that is intended to be agnostic to processing engines and frameworks and to work across several file formats).

If the subject system is accessing the EP of a repeated field, the subject system could optionally ask for the structured type path EP (referred to as path EP going forward), and if the path EP does not exist, then the subject system could fall back to using the field EP with some additional care needed, which the subject system will cover in the following section. Since path EPs are produced in a best-effort manner, there might be a case where path EPs only exist for some data files but not all. In that case, the subject system determines a way to combine path EPs and field EPs when the subject system needs to merge these EPs.

The following discussion relates to utilizing structured type EPs.

Once the expression properties is populated, the compiler (e.g., job compiler 212) makes use of them. For non-repeated fields, the behavior is are compatible with that of a regular column. For repeated fields, there are 2 cases:
1. The subject system finds the path EPs. In this case the data dependent optimization behavior is still identical to the regular column.
2. The subject system does not find the path EPs. In this case, the subject system can still fall back to using field EP. If the subject system does not find the field EP, the subject system populates the field EP with the default value. Filling default values is an operation in the EP layer that's transparent to the compiler.

For case 2, numDistinct (number of distinct values) and numNulls (number of nulls) in the field EPs accounts for all values in the repeated fields, that is, across all array elements and all map entries. A new field num Values are populated in expression properties to indicate the EP is for a repeated field and to represent the number of total values in the field across all entries. Data dependent optimization code in the compiler is modified to avoid side-effects in existing logic for repeated field based on the existence of num Values. When it exists, num Values also needs to be leveraged to perform the proper behavior. Making sure the subject system applies new logic in all places in the compiler is important for not introducing data corruption, wrong results and performance regression. The following discussion relates to in-memory EP storage.

In an implementation, the logic regarding the in-memory EP storage, e.g. expression properties and the like, accounts for repeated field EP.

A new interface isRepeatedFieldEP( ) is added to expression properties to indicate accessing the EP with num Values which are used to guard the new logic added for repeated field EP access in both expression properties and compiler logic outside of the class.

When elements in the repeated fields in arrays or maps are extracted, the resulting expressions are always nullable despite the nullability of the field could be not null. In the EP of the expression, hasNulls should never be NONE even if there's not nulls in all array elements.

In an implementation, repeated field EP behavior diverges from regular EP mainly in the following ways:
1. Null counts and distinct value counts need to be compared to the number of values that's different from the number of rows in a file in estimating null count and NDV (number of distinct values) of the expression. These counts cannot be used as precise values to perform optimization and metadata query answering if there are accesses to slices of the array or map. E.g., not accessing the field using flatten.
2. Similarly, the min/max range of a field is a superset of min/max fields of any extraction function that accesses slices of elements in the field, so they cannot be used as the precise min/max in metadata query answering and other potential optimization.

The next sections are the approaches to systematically enumerate the logic that needs to change for repeated field EPs.

The following discussion relates to using num Values instead of row count.

The usages of row counts are in the following 3 categories:
  Accessing row counts as file-level properties as opposed to column-level properties that would be compared with the null or distinct count of a column, for example, when computing the aggregated row count in all pruned files in a table. In this case, there is no related EP access.
  Using row counts as arguments to access properties regarding nulls and distinct values in expression properties. The access logic in the EP storage class discussed above has already accounted for num Values.
  Using row counts in certain logic in the compiler that needs to change to account for num Values. In an example, two scenarios in this category are when computing count function result in metadata query answering and when collecting the histogram.

The following discussion relates to treating Min/Max in field EPs as approximate values.

The expression properties already has an enum Scope that indicates whether the EP could be approximate. From the use of the enum, it indicates that the EPs could be PRUNED, which already implies it is approximate, or GLOBAL, meaning it's the precise global EP, or GLOBAL_APPROX, meaning it is the global EP that might not be precise because some EP loading is skipped. The approach to identify all places that require MIN/MAX to be precise is to enumerate the usage of these enums. In an example, the only usage that includes changes to account for repeated field EP is metadata query answering for MIN/MAX functions.

In an example, a new interface isMinMaxApproximate( ) in expression properties is provided to indicate the min/max range is approximate even if all EPs are loaded.

The following discussion relates to runtime pruning. In some embodiments:
  Structured field access is pushed down into table scans as fake virtual columns like variant subcolumns.

Runtime file-level join pruning with compiler populated min/max mostly follows the variant runtime pruning code path by populating fake virtual column meta to the scanset.

Row group level pruning/smart scan on structured type is not based on EP. They should work for structured field access similarly to regular columns as long as the proper column ordinal is populated in the scan node. In an example, block pruning is supported in the scan node.

EP-scan based file-level runtime join pruning can be provided.

Row group level join pruning can be provided.

Page-level pruning can be provided.

The following discussion relates to physical type derivation.

To allow structured fields to have performance characteristics that are close to regular columns, physical types of primitive fields will be derived in a best-effort manner for all fields within a structured object and primitive fields extracted out of a structured object. More specifically:

When a primitive field from a structured typed table column is selected, physical type will be derived as long as the field extraction is pushed into scan.

When a structured typed table column is selected, physical type derivation will be performed on all primitive fields in the structured column.

When casting a structured type from an arbitrary variant, compiler (e.g., job compiler 212) does not always know the physical type beforehand. Some heuristics can be applied if the cast is on a variant that's directly constructed from some primitive expressions.

E.g., deriving the physical type of field a, b in column obj in the following query to be the type of int_col and str_col: select OBJECT_CONSTRUCT('a', int_col, 'b', str_col)::OBJECT(a int, b string) obj from table;

If the physical type cannot be derived due to lack of metadata, derivation is performed of the physical type to be the largest type for the logical type.

When extracting a field from a structured object during execution, populating the physical data type from the object.

E.g., The physical data type of column a in the following query will be derived as the physical type of int_col: select OBJECT_CONSTRUCT('a', int_col, 'b', str_col)::OBJECT(a int, b string):a a from table;

The following discussion relates to EP metadata.

Similar to Column metadata persistence, EPs are collected and maintained for Structured Type leaf-level fields as well. Structured Type EPs can be created either as part of Insert operations for files produced by the subject system, or from reading the Parquet footers during Create/Refresh Iceberg Table commands directly. In an implementation, the compiler leverages Structured Type field EPs, and missing EPs are handled in the same way as for subcolumns. Structured Type EPs use a different namespace from Subcolumn EPs and use field Ordinals as keys.

Beyond Ordinals, an optional Path ID key is also supported for Structured Type EPs, which can be used to store EPs for Path Extractions for Arrays and Maps that are not part of the field definition itself. These Path Extraction EPs will be generated in a similar way to how Subcolumn EPs are produced, and can be leveraged for further Data Dependent Optimizations such as pruning similar to Subcolumn EPs beyond what is provided at the field level. EPs for Path Extractions can be done independent of the encoding in data storage. For Iceberg Tables where subcolumn encoding is not performed, EPs for a specific extraction path can be stored in structured types when gathering information about the path during ingestion. Path Extraction EP ensures that pruning and data dependent optimization of structured types will have performance parity with that of variant data types.

EPs such as min/max/numDistinct/numNulls for repeated Structured Type fields such as Arrays and Maps are derived from aggregations across the individual elements of the field. An additional EP property, numValues, is maintained for repeated Structured Type fields to distinguish between the number of values and the number of rows. Storing the number of values in repeated fields accurately allows to continue using Number of Distinct Values/Null Counts in these fields, since they are now upper bounded by the number of values instead of row count.

The following discussion relates to EP design for structured types.

Terms

Column ID—system generated ids for each primary column which are unique at the account level (for clone).

Column Ordinal—system generated id for each primary column and structured field which are unique at the table level External ID—table-level unique ids for each primary column and structured field. Required for scan. Also used as the id-name mapping in the Iceberg schema Column/Field Name—name of a primary column or structured field which each associates with a column ordinal/external id.

Extraction Path—Sequences of field names and slices of arrays/maps to indicate the extraction location in structured types. e.g., a.b[0].c The following discussion relates to Required Properties of Structured Field EPs.

In general, the expected behavior for structured fields is closer to primitive columns than subcolumns of variant data types. The required properties of structured field EPs can be a superset of existing column EPs, which are listed below:

1. EPs of structured fields need to be indexed using some combination of ids, not the path name to always be mapped to a structured field which could be renamed.

2. Min/Max values in the EPs will be populated for structured fields in a Parquet file in a best-effort manner.

3. The total number of values for an array element field and a map's key/value field (and the nested fields inside of them) in a file can be different from the total number of rows in a file. It is needed to track that for each of these fields separately. This is essential for the compiler to make decisions without making the assumption of numValues=numRows.

4. Extracting EPs for some paths that contain slices of arrays, specific map indexes is still possible (and can be done without actually subcolumnarizing the path in the storage).

The following discussion relates to EP-side storage layout.

Column EPs will be indexed using a tuple of <ColumnID, SubColumnPathId, StructuredTypeFieldOrdinal, StructuredTypePathID>, where SubColumnPathId is an optional field that's only required for subcolumns EPs, StructuredTypeFieldOrdinal is an optional field that's only required for structured field EPs, which will be populated using structured fields' Column Ordinal, and StructuredTypePathID is an optional field that's only required for structured field EPs for a specific Extraction Path.

The metadata layer keeps a mapping between Extraction paths for subcolumn/Structured Typed and SubColumnPathId and StructuredTypePathID to allow the compiler to retrieve the EP entries by name.

num Values is stored for repeated structured fields where the total number of elements could be different than the total number of rows in a file. E.g., any array element fields, map key fields, map value fields and nested fields in them. EP needs to surface this information to the compiler, and the compiler needs to have different logic to account for the field when it exists.

The following discussion relates to various design decisions.

1. To handle schema evolution without losing EPs, Structured Field EPs are accessed using the Primary Column ID and the Column Ordinal of the field instead of the Extraction Paths. Regular column EPs are still going to be accessed only using the Column ID without specifying the ordinal.

2. num Values is stored as an additional property in the EP file for all repeated fields as it is mentioned in the above storage layout section. When this field is populated in a field EP, the compiler (e.g., job compiler 212) will need to properly utilize this field in all places, meaning that logic is provided that assumes numRows=num Values to account for the new property. For example, such logic compares num Values instead of numRows against numNulls and numDistinct to determine if this is an all-null field or a unique (all-distinct) field. Missing num Values implies a fallback to using numRows.

3. The min/max/nulls/numDistinct stats for non-repeated fields, e.g., primitive fields in a structured OBJECT column, are populated just like regular columns. For repeated fields, the stats will correspond to all values in the field as if the arrays and maps are flattened.

a. For example, if there is a ARRAY(INT) with 3 rows (row1=[v1, v2], row2=[v3], row3=[v4, v5, v6]), then performing a computation of stats on values [v1 . . . v6]. This bound will be valid for any index accessed in that array.

b. For example, if there is a MAP(string, int) with 3 rows (row1={'k1': v1, 'k2': v2}, row2={'k3': v3}, row3={'k4': v5, 'k5': v5, 'k6': v6}), then performing a computation of stats on both keys [k1 . . . k6] and values [v1 . . . v6]. The bound of the value field EP will be valid for any key accessed in that map.

4. Like primitive regular columns, when a primitive structured field is in a data file, it must add the corresponding entry in a EP-file. Missing EPs for a primitive structured field should be treated the same way as missing column EPs on primitive structured primary columns, meaning populating the min/max values using the field default, not "unknown". For repeated fields, i.e. array element fields and map key/value fields and fields nested in them, the num Values will be populated with a number of 0 when there's an missing EP due to schema changes and the compiler will need to make use of that.

a. Field has EP. All arrays in a file is empty.
        i. num Values=0 for array element field
    b. Missing EPs due to schema evolution.
        i. Arrays should be nulls
        ii. num Values=0 for array element field
        iii. Make sure the compiler logic take the decision into consideration
            1. E.g., Check null pruners.

5. The EP interface will be flexible enough to generate and access EPs for any Extraction Path that contains array or map extraction operations to a primitive field. Both Structured Type Field and Extracted Path would map to StructuredTypePathIDs. When the EPs for these structured EPs with a Path are missing, fallback to the corresponding leafNode EP bounds mentioned in 4, with the caveat that min/max/nulls/distinct values are all approximate. Conceptually, extracting field EPs with Path could be done even when the Path that is accessed is not actually subcolumnarized in the data file. Semi-structured objects in a structured field can also have subcolumn EPs.

Limitations on structured type EPs can include:
a limitation on the max number of columns in a table=2000, with structured fields, the max column limit becomes num of leaf nodes+number of primitive columns <=2000. There's also implicit limitations due to the metadata size that can be persisted (~10 MB). This limit can be increased if needed.

200 max subcolumns limit per file for subcolumns coming from all VARIANT structured columns and repeated structured typed columns in the table.

The following discussion relates to Field EPs with Extraction Paths.

The interface to access field EPs with Extraction Paths in the compiler is similar to that of subcolumn EPs. They will be indexed by the StructuredFieldEpIdentifier, which is a tuple that consists of Column ID of the primary column, the Column Ordinal of the structured field being accessed, and an optional string field which indicates the Extraction Path where all the structured field names are substituted with their column ordinals. For example, the compiler uses "4562.123 [0]0.2315" instead of "a.b[0].c" when requesting the path's EP where a, b and c are all structured fields. Based on the implementation of field EP lookup in the metadata layer, this is required to uniquely identify an extraction path in the event of schema evolution.

Subcolumn EPs for variant structured fields could also be identified using the StructuredTypePathID field in the EP layer using the same interface as structured field EP with Path. For example, 4562.123[0]0.2315.d[12].e could be used to request the EP for the path a.b[0].c.d[12].e when a, b and c are structured fields and d[12].e is the access path for the variant field c. As it is shown in the above example, EP could theoretically be computed and looked up for a Path with a combination of extractions for repeated structured fields and variant data.

The following are examples to better illustrate the implementations discussed above. In an example, the EP storage format is a tuple of <ColumnID, SubColumnId, StructuredTypeFieldOrdinal, StructuredTypePathID>. The top-level column has a ColumnID of 1000. Numbers associated with fields in the diagrams are their Column Ordinals.

Figure 4:
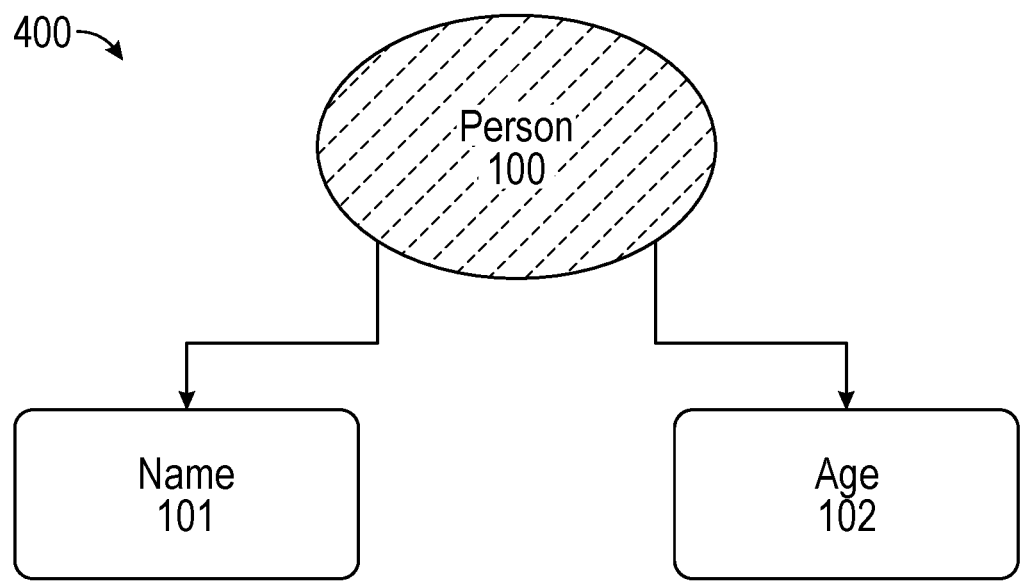
FIG. 4 is a diagram of an example of expression properties of structured objects, in accordance with some embodiments of the present disclosure.

FIG. 4 is a diagram of an example of expression properties 400 of structured objects, in accordance with some embodiments of the present disclosure.

In the columEPs section of the EP file, there are 2 entries for the column which further keyed at their Column Ordinals for the 2 leaf fields.

```
fieldEPs: {
    <1000, null, 101, null> :
        { Min: m1,
          Max: m2
        },
    <1000, null, 102, null>:
        { Min: n2,
          Max: n2
        }
},
fieldEPsWithPath: { }
``` fieldEPsWithPath are empty because there are no ARRAY/MAP in any path to any leaf Now, whenever a query accesses a path person. name,
1. The path person.name doesn't have any extraction operation, so the compiler will not look up for fieldEPsWithPath and directly look up fieldEPs
2. fieldEPs lookup succeeds. Use (m1 & m2) as the bounds.
3. If fieldEPs fails, populating the min/max using the default value of the field.

Figure 5:
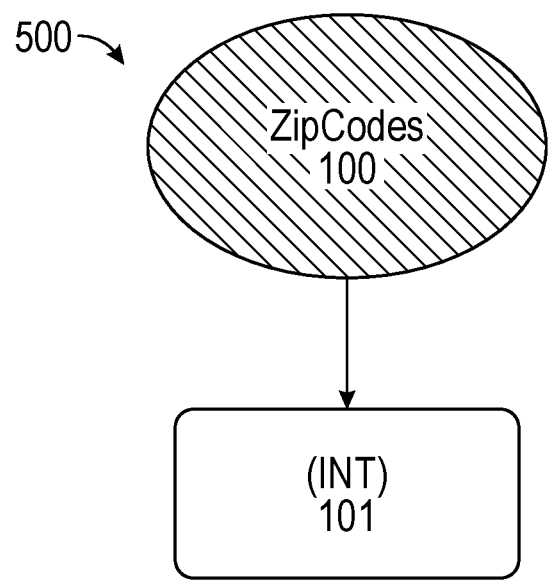
FIG. 5 is a diagram of an example of expression properties of structured arrays, in accordance with some embodiments of the present disclosure.

FIG. 5 is a diagram of an example of expression properties 500 of structured arrays, in accordance with some embodiments of the present disclosure.

Here there will be only 1 entry in the fieldEPs for the array element field and there are 2 entries in fieldEPsWithPath with their own StructuredTypePathID 1 and 2 which is required to be column-level unique.

```
fieldEPs: {
    <1000, null, 101, null>:
        { Min: m1,
          Max: m2
        }
},
fieldEPsWithPath: {
    <1000, null, null, 1(for ZipCodes[0])>: {
        Min: p1,
        Max: p2
    },
    <1000, null, null, 2(for ZipCodes[1])>: {
        Min: q1,
        Max: q2
    }
}
```

Now, whenever a query accesses a path zipcodes[0], the compiler resolves the path to an ID-based path and try to retrieve the path EP in fieldEPsWithPath by substituting names in the path to the Column Ordinal. So zipcodes[0] is converted to 100[0].

Figure 6:
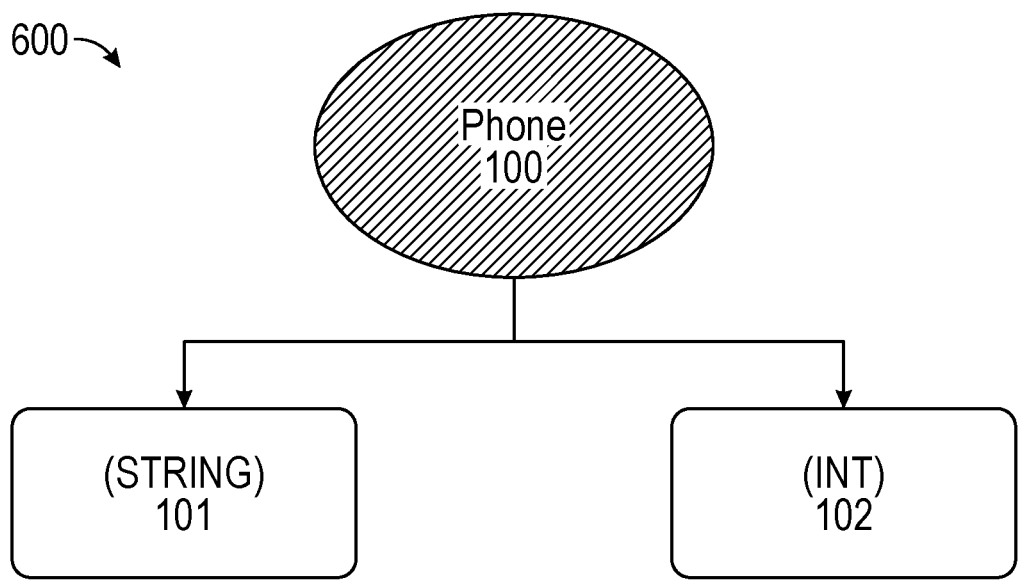
FIG. 6 is a diagram of an example of expression properties of maps, in accordance with some embodiments of the present disclosure.

The query that accesses zipcodes[0] as finding the fieldEPsWithPath for the path and hence directly populating the min/max bounds p1 and p2. If it had been missing like when zipcodes[1005] is accessed, then falling back to using m1 and m2 which are valid bounds for any index accessed in this array. At any point, this will hold $m1 <= \min(p1,q1)$ and $m2 >= \max(p2,q2)$ FIG. 6 is a diagram of an example of expression properties 600 of maps, in accordance with some embodiments of the present disclosure.

This is a MAP<STRING, INT> type, and there are 2 entries with Column Ordinals 101 and 102. For variant objects, there's no EPs for fields, so there's no logic in the optimizer to utilize them. EPs for map's key field are populated as they can be useful in data-dependent optimizations regarding map extraction.

```
fieldEPs:
    <1000, null, 101, null>:
        { Min: m1,
          Max: m2
        },
    <1000, null, 102, null>:
        { Min: n1,
          Max: n2
        }
},
fieldEPsWithPath: {
    <1000, null, null, 1(for phone["home"])>: {
        Min: p1,
        Max: p2
    },
    <1000, null, null, 2(for phone["office"])>: { Min:
        q1,
        Max: q2
    }
}
```

To access fieldEPsWithPath for MAPs, the compiler similarly rewrites the name-based path to an id-based path to require the EP for the path. For example, when phone [office] is accessed, it is converted to 100[office] after being used to retrieve EP.

Like in the previous example, performing a lookup of the fieldEPsWithPath first for a path that involves map extraction. If an entry exists there, then using the EP for the path directly, otherwise fallback to the fieldEP which is mostly approximate. For example, when retrieving the EP for phone ["office"], finding an path EP entry and hence using q1 and q2 as bounds. When retrieving the EP for phone ["personal"], fall back to using n1 and n2. Here too, at any point this will hold.

$n1 <= \min(p1,q1)$ and $n2 >= \max(p2,q2)$

Figure 7:
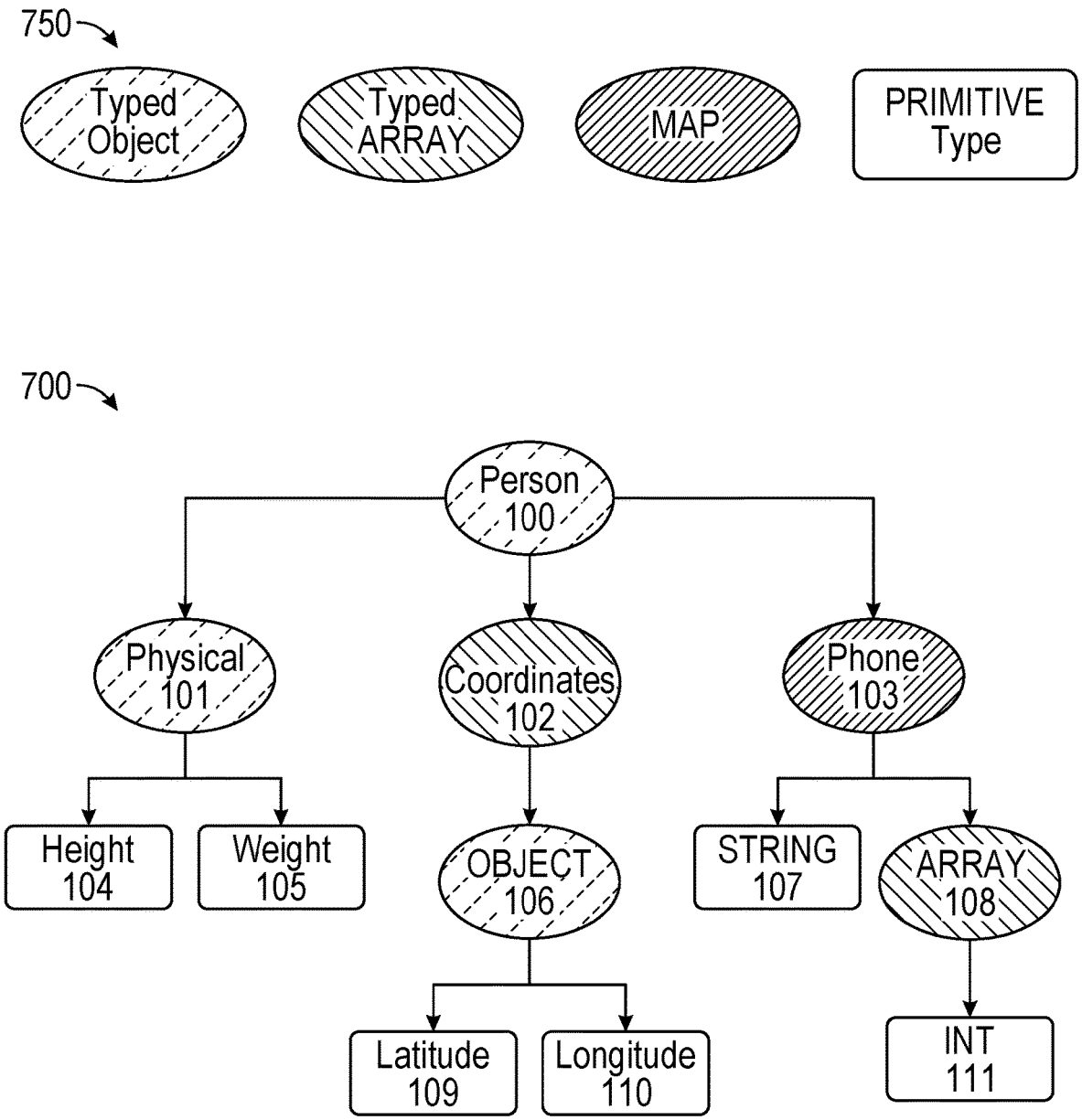
FIG. 7 is a diagram of an example of expression properties of nested structed types, in accordance with some embodiments of the present disclosure.

FIG. 7 is a diagram of an example of expression properties 700 of nested structured types 750, in accordance with some embodiments of the present disclosure.

The following example relates to a complex nested schema and illustrates how it all fits in the big picture.

```
fieldEPs: {
    <1000, null, 104, null>: { ... },
    <1000, null, 105, null>: { ... },
    <1000, null, 109, null>: { ... },
    <1000, null, 110, null>: { ... },
    <1000, null, 107, null>: { ... },
    <1000, null, 111, null>: { ... }
},
fieldEPsWithPath: { -- Max 200 entries
    <1000, null, null, 1(for person.coordinates[0].latitude)>
    : { ... },
    <1000, null, null, 2(for person.coordinates[1].latitude)>
    : { ... },
    <1000, null, null, 3(for person.coordinates[0].longitude)>
    : { ... },
    <1000, null, null, 4(for person.coordinates[1].longitude)>
    : { ... },
    <1000, null, null, 5(for person.phone["home"][0])> : { ...
    },
    <1000, null, null, 6(for person.phone["home"][1])> : { ...
    },
```

```
<1000, null, null, 7(for person.phone["office"][0])> : { ...
},
<1000, null, null, 8(for person.phone["office"][1])> : { ...
}
.
.
.
}
```

Figure 8:
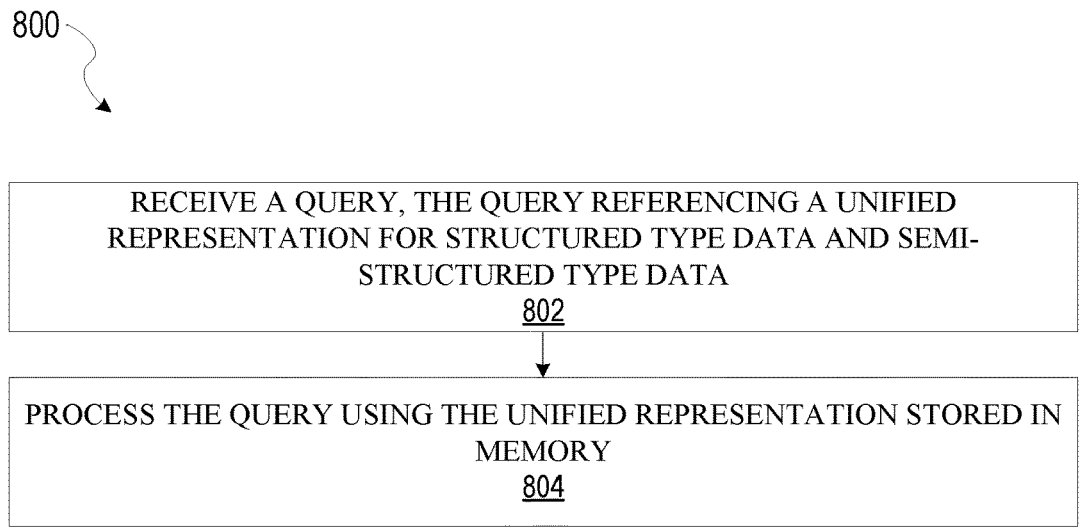
FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102. Accordingly, the method 800 is described below, by way of example with reference thereto. However, it shall be appreciated that method 800 may be deployed on various other hardware configurations and is not intended to be limited to deployment within the network-based database system 102.

At operation 802, network-based database system 102 receives a query, the query referencing a unified representation for structured type data and semi-structured type data, the unified representation being provided in storage and in memory during query processing, the unified representation comprising a set of structured type fields that include a set of semi-structured typed fields that enables type safety and enforcement for the set of structured type fields, and flexibility for the set of semi-structured typed fields in a same column, the unified representation in storage including type information for the semi-structured type data as part of the semi-structured type data itself, the unified representation being utilized for structured type data and semi-structured type data.

At operation 804, network-based database system 102 processes the query using the unified representation stored in the memory, the unified representation providing performance parity between structured type data and semi-structured type data.

In an embodiment, the semi-structured type data does not require a prior definition of a schema and a new attribute can be added to the semi-structured type data at a subsequent time.

In an embodiment, the semi-structured type data is stored in an array data type, an object data type, or a variant data type.

In an embodiment, network-based database system 102 further performs receiving a set of query results based on processing the query, the set of query results including a set of structured types.

In an embodiment, the set of query results comprises a JSON string format.

In an embodiment, the set of query results comprises an Apache Arrow format.

In an embodiment, network-based database system 102 further performs receiving a set of code statements, the set of code statements including first code indicating a particular structured data type; determining that the set of code statements includes a definition of content type for an array, an object, or a map; determining that the set of code statements includes second code to perform a type conversion from the particular structured data type to a particular semi-structured data type; and performing, using the second code, the type conversion from the particular structured data type to the particular semi-structured data type based at least in part on the definition of content type.

In an embodiment, network-based database system 102 further performs receiving a first semi-structured object; iterating through a list of fields specified by a target object type; for each field, determining whether a field with a same name is present in the first semi-structured object; and in response to the field being found in the first semi-structured object, converting a value of the field to a target field type.

In an embodiment, network-based database system 102 receiving first data from a first column of a table; determining that the first column comprises an array structured data type; and converting the array structured data type to an array semi-structured data type.

In an embodiment, network-based database system 102 further performs receiving first data from a first column of a table; determining that the first column comprises an object structured data type; and converting the object structured data type to an object semi-structured data type.

FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102. Accordingly, the method 900 is described below, by way of example with reference thereto. However, it shall be appreciated that method 900 may be deployed on various other hardware configurations and is not intended to be limited to deployment within the network-based database system 102.

At operation 902, network-based database system 102 receives a set of code statements, the set of code statements including first code indicating a structured data type.

At operation 904, network-based database system 102 determines that the set of code statements includes a definition of content type for an array, an object, or a map.

At operation 906, network-based database system 102 determines that the set of code statements includes second code to perform a type conversion from the structured data type to an semi-structured data type.

At operation 908, network-based database system 102 performs, using the second code, the type conversion from the structured data type to the semi-structured data type based at least in part on the definition of content type.

Figure 10:
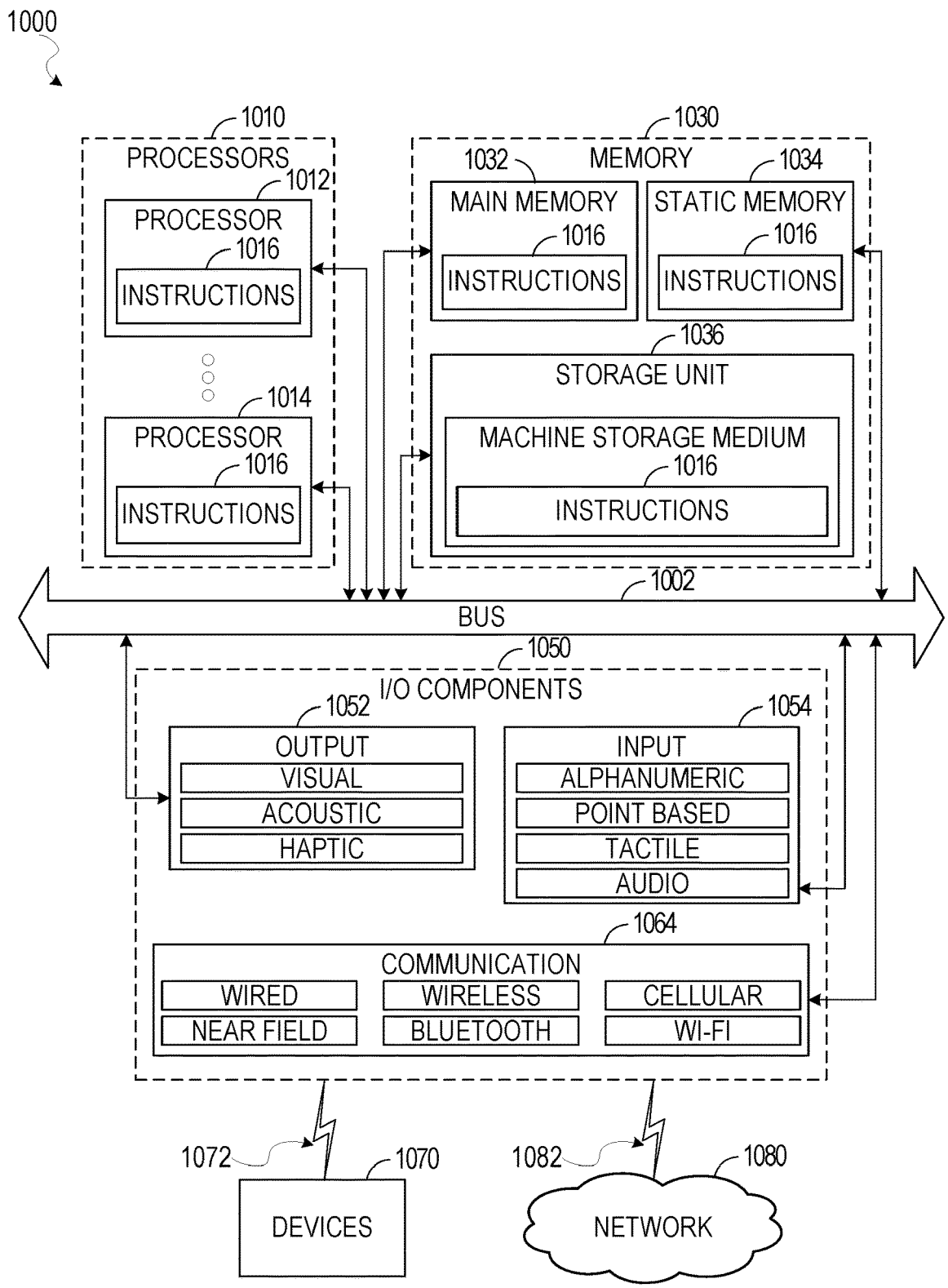
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods described above. As another example, the instructions 1016 may cause the machine 1000 to implement portions of the functionality illustrated in any one or more of the previously mentioned figures discussed above. In this way, the instructions 1016 transform a general, non-programmed machine into a particular machine 1000 (e.g., the compute service manager 108-1, the execution platform 110-1, and the user device 112) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the compute service manager 108-1, the execution platform 110, and the devices 1070 may include the user device 112 or any other computing device described herein as being in communication with the network-based database system 102 or the storage platform 104.

Executable Instructions and Machine Storage Medium

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a query, the query referencing a unified representation for structured type data and semi-structured type data, the unified representation being provided in storage and in memory during query processing, the unified representation comprising a set of structured type fields that include a set of semi-structured typed fields that enables type safety and enforcement for the set of structured type fields, and flexibility for the set of semi-structured typed fields in a same column, the unified representation in storage including type information for the semi-structured type data as part of the semi-structured type data, the unified representation being utilized for structured type data and semi-structured type data;
   processing the query using the unified representation stored in the memory, the unified representation providing performance parity between structured type data and semi-structured type data;
   receiving a set of code statements, the set of code statements including first code indicating a particular structured data type;
   determining that the set of code statements includes a definition of content type for an array, an object, or a map;
   determining that the set of code statements includes second code to perform a type conversion from the particular structured data type to a particular semi-structured data type; and
   performing, using the second code, the type conversion from the particular structured data type to the particular semi-structured data type based at least in part on the definition of content type.

2. The system of claim 1, wherein the semi-structured type data does not require a prior definition of a schema and a new attribute can be added to the semi-structured type data at a subsequent time.

3. The system of claim 1, wherein the semi-structured type data is stored in an array data type, an object data type, or a variant data type.

4. The system of claim 1, wherein the operations further comprise:
   receiving a set of query results based on processing the query, the set of query results including a set of structured types.

5. The system of claim 4, wherein the set of query results comprises a JSON string format.

6. The system of claim 4, wherein the set of query results comprises an Apache Arrow format.

7. The system of claim 1, wherein the operations further comprise:
   receiving a first semi-structured object;
   iterating through a list of fields specified by a target object type;
   for each field, determining whether a field with a same name is present in the first semi-structured object; and
   in response to the field being found in the first semi-structured object, converting a value of the field to a target field type.

8. The system of claim 1, wherein the operations further comprise:
   receiving first data from a first column of a table;
   determining that the first column comprises an array structured data type; and
   converting the array structured data type to an array semi-structured data type.

9. The system of claim 1, wherein the operations further comprise:
   receiving first data from a first column of a table;
   determining that the first column comprises an object structured data type; and
   converting the object structured data type to an object semi-structured data type.

10. A method comprising:
    receiving a query, the query referencing a unified representation for structured type data and semi-structured type data, the unified representation being provided in storage and in memory during query processing, the unified representation comprising a set of structured type fields that include a set of semi-structured typed fields that enables type safety and enforcement for the set of structured type fields, and flexibility for the set of semi-structured typed fields in a same column, the unified representation in storage including type information for the semi-structured type data as part of the semi-structured type data, the unified representation being utilized for structured type data and semi-structured type data;
    processing the query using the unified representation stored in the memory, the unified representation providing performance parity between structured type data and semi-structured type data;
    receiving a set of code statements, the set of code statements including first code indicating a particular structured data type;
    determining that the set of code statements includes a definition of content type for an array, an object, or a map;
    determining that the set of code statements includes second code to perform a type conversion from the particular structured data type to a particular semi-structured data type; and
    performing, using the second code, the type conversion from the particular structured data type to the particular semi-structured data type based at least in part on the definition of content type.

11. The method of claim 10, wherein the semi-structured type data does not require a prior definition of a schema and a new attribute can be added to the semi-structured type data at a subsequent time.

12. The method of claim 10, wherein the semi-structured type data is stored in an array data type, an object data type, or a variant data type.

13. The method of claim 10, further comprising:
    receiving a set of query results based on processing the query, the set of query results including a set of structured types.

14. The method of claim 13, wherein the set of query results comprises a JSON string format.

15. The method of claim 13, wherein the set of query results comprises an Apache Arrow format.

16. The method of claim 10, further comprising:
    receiving a first semi-structured object;
    iterating through a list of fields specified by a target object type;

for each field, determining whether a field with a same name is present in the first semi-structured object; and in response to the field being found in the first semi-structured object, converting a value of the field to a target field type.

17. The method of claim 10, further comprising:

receiving first data from a first column of a table;

determining that the first column comprises an array structured data type; and converting the array structured data type to an array semi-structured data type.

18. The method of claim 10, further comprising:

receiving first data from a first column of a table;

determining that the first column comprises an object structured data type; and converting the object structured data type to an object semi-structured data type.

19. A non-transitory computer-storage medium comprising instructions that, when executed by one or more processors of a machine, configure the machine to perform operations comprising:

receiving a query, the query referencing a unified representation for structured type data and semi-structured type data, the unified representation being provided in storage and in memory during query processing, the unified representation comprising a set of structured type fields that include a set of semi-structured typed fields that enables type safety and enforcement for the set of structured type fields, and flexibility for the set of semi-structured typed fields in a same column, the unified representation in storage including type information for the semi-structured type data as part of the semi-structured type data, the unified representation being utilized for structured type data and semi-structured type data;

processing the query using the unified representation stored in the memory, the unified representation providing performance parity between structured type data and semi-structured type data;

receiving a set of code statements, the set of code statements including first code indicating a particular structured data type;

determining that the set of code statements includes a definition of content type for an array, an object, or a map;

determining that the set of code statements includes second code to perform a type conversion from the particular structured data type to a particular semi-structured data type; and performing, using the second code, the type conversion from the particular structured data type to the particular semi-structured data type based at least in part on the definition of content type.

20. The non-transitory computer-storage medium of claim 19, wherein the semi-structured type data does not require a prior definition of a schema and a new attribute can be added to the semi-structured type data at a subsequent time.

21. The non-transitory computer-storage medium of claim 19, wherein the semi-structured type data is stored in an array data type, an object data type, or a variant data type.

22. The non-transitory computer-storage medium of claim 19, wherein the operations further comprise:

receiving a set of query results based on processing the query, the set of query results including a set of structured types.

23. The non-transitory computer-storage medium of claim 22, wherein the set of query results comprises a JSON string format.

24. The non-transitory computer-storage medium of claim 22, wherein the set of query results comprises an Apache Arrow format.

25. The non-transitory computer-storage medium of claim 19, wherein the operations further comprise:

receiving a first semi-structured object;

iterating through a list of fields specified by a target object type;

for each field, determining whether a field with a same name is present in the first semi-structured object; and in response to the field being found in the first semi-structured object, converting a value of the field to a target field type.

26. The non-transitory computer-storage medium of claim 19, wherein the operations further comprise:

receiving first data from a first column of a table;

determining that the first column comprises an array structured data type; and converting the array structured data type to an array semi-structured data type.

27. The non-transitory computer-storage medium of claim 19, wherein the operations further comprise:

receiving first data from a first column of a table;

determining that the first column comprises an object structured data type; and converting the object structured data type to an object semi-structured data type.

\* \* \* \* \*